(12) United States Patent
Masuda et al.

(10) Patent No.: US 6,678,474 B1
(45) Date of Patent: Jan. 13, 2004

(54) LIGHTWAVE NETWORK DATA COMMUNICATIONS SYSTEM

(75) Inventors: Michio Masuda, Tokyo (JP); Motoo Nishihara, Tokyo (JP); Kenshin Yamada, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/534,294

(22) Filed: Mar. 23, 2000

(30) Foreign Application Priority Data

Mar. 30, 1999 (JP) .......................................... 11-089840

(51) Int. Cl.[7] ................................................ H04J 4/00
(52) U.S. Cl. ............................. 398/75; 398/68; 398/71; 398/98; 398/99
(58) Field of Search ................................. 359/123, 135; 370/469; 398/68, 71, 75, 98, 99

(56) References Cited

U.S. PATENT DOCUMENTS

| | | | | |
|---|---|---|---|---|
| 5,600,644 A | * | 2/1997 | Chang et al. | 370/404 |
| 6,269,101 B1 | * | 7/2001 | Gerszberg et al. | 370/404 |
| 6,501,741 B1 | * | 12/2002 | Mikkonen et al. | 370/310 |
| 6,512,745 B1 | * | 1/2003 | Abe et al. | 370/232 |

FOREIGN PATENT DOCUMENTS

| | | |
|---|---|---|
| JP | 7-99483 | 4/1995 |
| JP | A 2000-253050 | 9/2000 |
| JP | A 2000-253058 | 9/2000 |

OTHER PUBLICATIONS

C. Guillemot, F. Clerot, Optical packet switching for WDM IP gigabit routers, ECOC'98, Sep. 20–24, 1998, pp. 433–434.*

Presentation by Bernd Heinrichs of Cisco Systems, Inc.*

M. Nishihara et al., "A Proposal of Photonic Router Network," Electronic Information Communications Association General National Conference (Mar. 11, 1999), 1999, p. 193. No Translation.

* cited by examiner

Primary Examiner—Jason Chan
Assistant Examiner—Dzung Tran
(74) Attorney, Agent, or Firm—Young & Thompson

(57) ABSTRACT

A lightwave network data communications system having such an architecture that routing operation within a lightwave network is simplified, and a high-speed transfer process is attained in a large-scale basic network utilizing a wavelength division multiplexing (WDM) technology which accommodates internet traffics from a plurality of subscriber networks. The lightwave network data communications system includes a unit for giving a lightwave router address to an edge router and a core router in the lightwave network, a unit for resolving a destination lightwave router address and an aggregated flow identifier about an IP packet received from a subscriber, and encapsulating the IP packet into a lightwave adaptation frame with these pieces of data contained in header information in the edge router, a unit for encapsulating a plurality of packets each having a length under a fixed length into a superframe, a unit for executing a share-ride scheme in which the packets of a plurality of IP flows can be shared as a superframe, and a unit for monitoring the traffic on the superframe basis and regulating an excessive traffic.

11 Claims, 18 Drawing Sheets

FIG.7

| MODE | CONTENT | APPLICATION TOPOLOGY |
|---|---|---|
| SINGLE FRAME MODE | USER PACKET IS ENCAPSULATED INTO LIGHTWAVE ADAPTATION FRAME. OVERHEAD BY 40-BYTES LIGHTWAVE ADAPTATION FRAME HEADER IS GIVEN TO MINIMUM PACKET. | THIS MODE IS USED IN TOPOLOGY OF BEING CONNECTED TO LIGHTWAVE NETWORK AND USED WHEN SUFFICIENT LINK CAPACITY IS TAKEN ON LIGHTWAVE NETWORK SIDE. |
| SUPER FRAME MODE | USER PACKETS BELONGING TO SAME AGGREGATED FLOW ARE PATCHED TO FORM BIG PACKET OVER FIXED LENGTH, AND BIG PACKET IS ENCAPSULATED INTO LIGHTWAVE ADAPTATION FRAME. OVERHEAD OF LIGHTWAVE ADAPTATION FRAME HEADER IS THEREFORE RELIEVED. | THIS MODE IS USED IN TOPOLOGY OF BEING CONNECTED TO LIGHTWAVE NETWORK. |

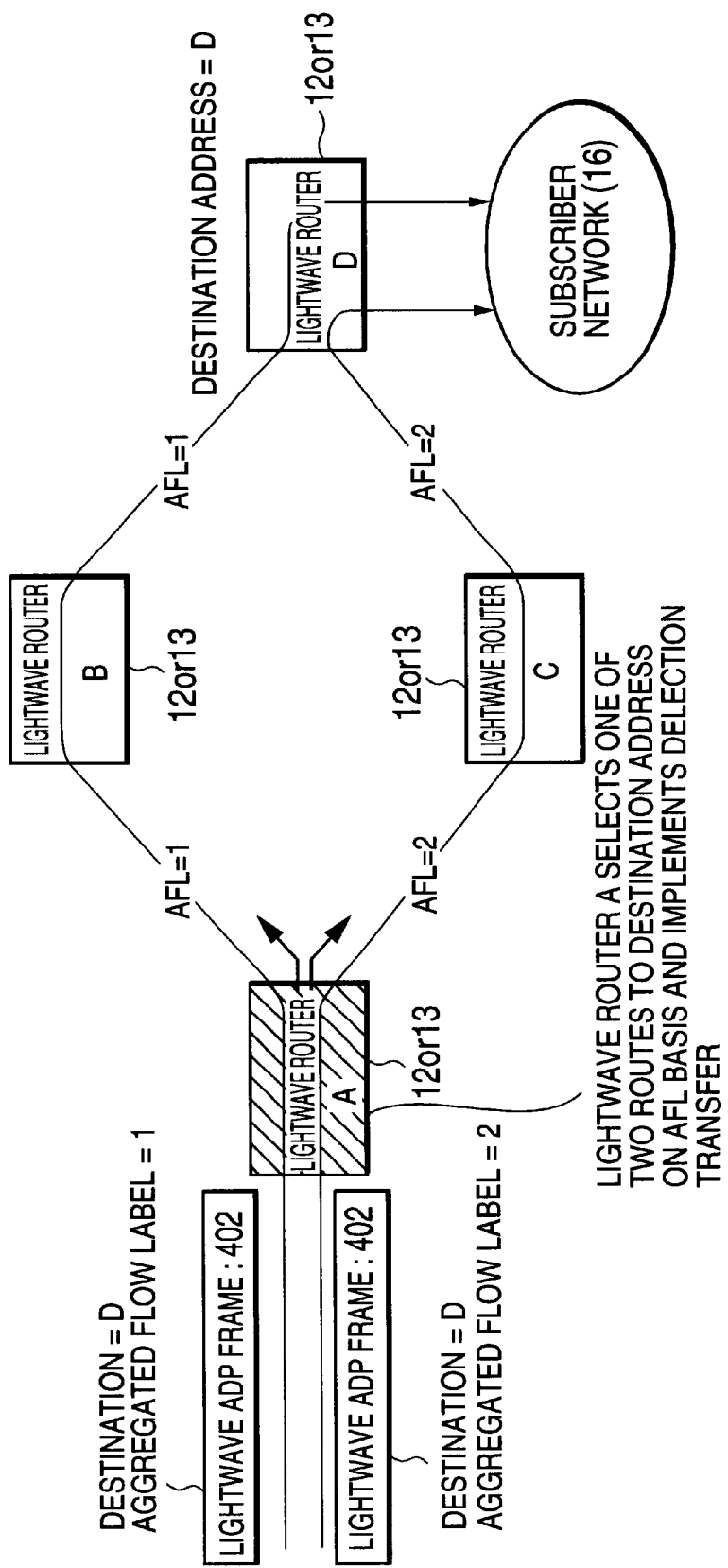

LIGHTWAVE NETWORK DATA COMMUNICATIONS SYSTEM

BACKGROUND OF THE INVENTION

1. Field of the Invention

The present invention relates generally to a lightwave network data communications system, and more particularly to a communications system for connecting a subscriber-side network and a lightwave network in the form of performing multidimensional data communications via a large-scale basic network (which is hereinafter referred to as a lightwave network) utilizing a wavelength division multiplexing (WDM) technology.

2. Description of the Related Art

With a development and a spread of the Internet, a big problem to networking companies and communications common carriers in the Internet, is a rise in IP traffics. The traffics in the network are in the process of being unified in an IP platform, and in the meantime a fresh basic network topology suited to the IP traffics is now put into discussion. The IP traffics are on the verge of exceeding voice traffics, and a controversial point is that both of data and voices from respective homes and offices will be handled via IP lines in next one decade, wherein accounting might be based not on the time but on a data quantity.

Further, big corporations will shift long-distance lines to the IP network from the public switched telephone network (PSTN) in the year of 2000 or thereabouts, and it is predicted that the majority of network communications common carriers operating the core networks might purchase IP providers.

Thus, it is a high time to review how the telephone switched network mainly based on the existing voice traffics is located, and, with this opportunity, the communications carriers in the conventional fields move toward dealing with the IP traffics on the full scale, wherein it might be an urgent task to integrate the existing networks with the Internet.

Further, in the field of the network using the optical technologies, there is a jump advancement of structuring the network equipment adopting the WDM technology with concentration upon the markets in the North America, and it is said that the WDM will become dominant in the future optical communications.

The WDM is the technology for scheming an expansion of a transmission path capacity by multiplexing wavelengths of a plurality of carrier waves, and a quantity of the information transmitted via the optical fibers can be increased by leaps.

A transmission wavelength band of the optical fiber is sufficiently broad, however, the conventional time division multiplexing technology is incapable of fully using that wavelength band.

For example, even if 500 Gbit/sec is actualized on the TDM1 channel, an occupying band thereof is 500 to 600 GHz (approximately 5 nm as a wavelength band) at the maximum. There is such a symptom that a further increase in the capacity by the TDM comes to a deadlock very soon, and the rapid progress which has been made so far can not be anticipated unless there appears a technical breakthrough.

An advantage of utilizing the WDM technology is that together with the larger increase in the capacity owing to the multiplexing, the transfer can be speeded up by a transparent transmission of a relay node, and a processing load upon the relay node can be relieved.

Further, according to a technology reported in "One Method of Actualizing Connectionless over ATM," Ogawa, Masuda, et al., the Electronic Information Communications Association Technical Study Report SSE97-36, 1997, for attaining the speed-up and the further increase in the capacity in ATM connectionless intra-network routing, in an ATM connectionless network constructed of an edge router incorporating a gateway function to a core network and an intra-network core router, the edge router conceived to be smaller in scale than the intra-network core router aggregates protocol processes, and the intra-network core router does not execute software-based protocol processes but actualize all of these processes by hardware. Even the prior art described above, however, does not disclose at all a method by which the lightwave network accommodates the existing subscriber network, and the high-speed transfer is implemented.

According to the WDM, however, wavelength resources are limited, and hence it is not a realistic solution that a usage (Local Significant: VPI/VCI, etc. in ATM) such as allocating a wavelength to an end-to-end connection. Then, the standard organization OIF Optical Internetworking Forum) for the WDM-based transmission system of the IP data reviews the existing SDH layers, and there is a concept of a system (IP over WDM) for transferring the IP data directly on the WDM-based transmission path. This system is neither yet controversial nor comes to standardization thereof.

Further, in an all-optical network which is desired to be actualized in the future, the lightwave frames are only optically processed and routed, including a switching operation. A core technology needed for this routing is not the framing of the lightwave frame but related to a switching speed of the optical switch and actualization of a burst-receivable high-speed PLL (Phase Locked Loop).

What is particularly hard to actualize is the latter burst-receivable PLL, and, though desired to attain a drastic progress of the present technology, it may be adequate to use the switching technology involving an electrical process in the present technical situation.

Normally, a packet switch based on the electric process, however, effects switching on a minimum 64-bytes IP packet basis. Therefore in the case of the packet switch having an accommodated interface showing an interface speed on the order of, e.g., 2.4 Gbps, a switch scheduling judgement must be made within a time given such as 64 bytes×8 bits×1/2.4 Gbps=210 nsec. Hence, there exist drawbacks of being unable to follow up with a large-scale switch having a tera-level capacity in the future and of deficiency in terms of compatibility with the high-speed large-capacity network.

Moreover, Japanese Patent Application Laid-Open No. Hei 7-99483 discloses a technology relative to an optical communications system including a network controller for controlling in concentration allocation of time slots to a plurality of nodes in the communications between the plurality of nodes for transmitting and receiving the data by use of the time slots, wherein optical transmission channels for the respective wavelengths are each divided into a plurality of channels in the wavelength division multiplexing optical network. This technology is an invention contrived to obviate a problem in which the traffic is restricted by some nodes for transmitting a large quantity of data, and other nodes are incapable of ensuring a free time slot common to other transmitting destination nodes.

In the technology disclosed in the Publication described above, it is not a realistic solution that an allocation of the time slots is managed in concentration with respect to the individual IP flows occurred by several millions for one second, and an application to the high-speed large capacity has a drawback.

SUMMARY OF THE INVENTION

It is an object of the present invention, which was contrived under such circumstances, to provide a lightwave network communications system capable of simplifying a routing operation within a lightwave network in such a form as to perform multiplexing data communications through a large-scale basic network (hereinafter referred to as a lightwave network) utilizing particularly a wavelength division multiplexing (WDM) technology, matching an existing subscriber-side network with the lightwave network by aggregating IP flows and framing batchwise a plurality of packets each having a length less than a fixed length, and actualizing an efficient mutual connections therebetween without being restricted by a packet switching processing speed at present.

To accomplish the above object, the lightwave network data communications system according to the present invention includes a unit for introducing, with a light adaptation layer matched with a transfer within the lightwave network being defined, this lightwave adaptation frame and framing IP (Internet Protocol) packets in accordance with a network QoS (Quality of Service), and a unit for actualizing functions of the following units as light adaptation layer processes.

The lightwave network data communications system according to the present invention has a first unit for giving lightwave router addresses for transferring to within the lightwave network to an edge router located at a gateway of the lightwave network and to a core router in a core network; a second unit for resolving a destination lightwave router address and an aggregated flow label (AFL) from QoS information and a destination IP address of an IP packet received from the subscriber side; a third unit for encapsulating the IP packets from the subscribers into a lightwave adaptation frame with the resolved destination lightwave router address aggregated flow identifier (AFL: aggregated flow label) contained in header information; a fourth unit for establishing a route in the lightwave network on the basis of the aggregated flow identifier (AFL: aggregated flow label) and the lightwave router address in the lightwave adaptation frame header, and performing such routing as to satisfy the QoS needed; a fifth unit for defining a superframe for corresponding to a super high-speed transmission network (OC-192 (Optical Carrier level 192), OC-768, OC-3072, etc.), and framing the IP packets on a superframe basis; a sixth (share-ride scheme) unit for constructing an architecture in which the packets of a plurality of IP flows can share the superframe as a transfer container in order to obtain a statistic multiple effect on the superframe basis; and a seventh unit for monitoring the traffic on the superframe basis, and regulating an excessive traffic in accordance with an indication given from a band management server as well as notifying the band management server of the monitored traffic.

BRIEF DESCRIPTION OF THE DRAWINGS

In the accompanying drawings:

FIG. 7 is an explanatory diagram showing a framing mode according to the embodiment of present invention;

FIG. 8 is an operational conceptual diagram showing a traffic dispersion procedure on an AFL (aggregated flow label) basis;

DESCRIPTION OF THE PREFERRED EMBODIMENTS

A lightwave network data communications system of the present invention is applied to a lightwave network.

Figure 1:
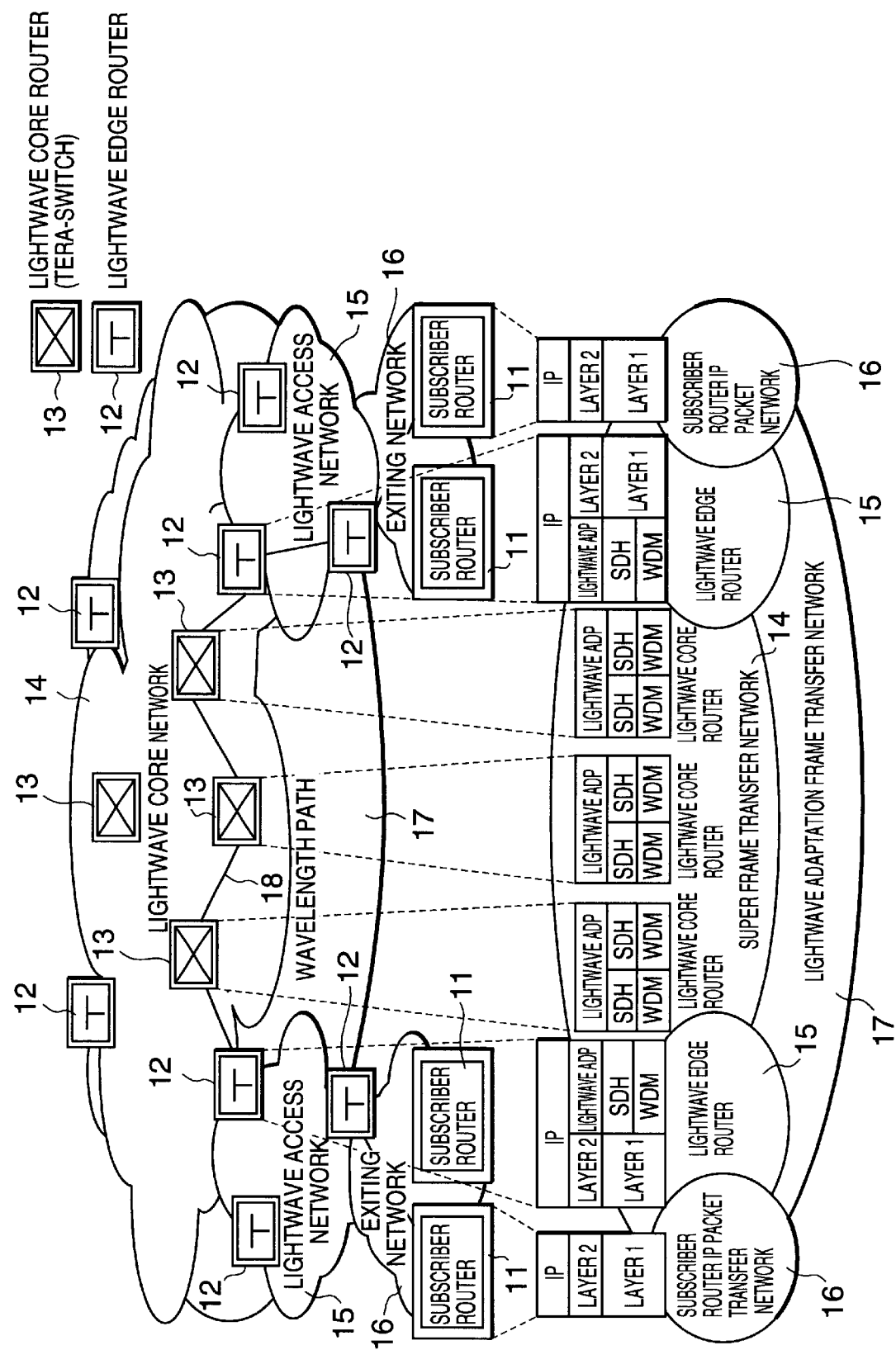
FIG. 1 is an explanatory diagram showing an architecture of a lightwave network to which the present invention is applied.

FIG. 1 is an explanatory view showing an architecture of the lightwave network to which the present invention is applied. An upper part in FIG. 1 represents a topology of the network, which shows an example of how lightwave access networks, a lightwave core network and existing networks are connected. Blocks shown in a lower part in FIG. 1 shows transfer networks and protocol hierarchical structures of a variety of routers, which correspond to the network topology described above.

A lightwave network 17 is constructed of, e.g., edge routers (lightwave edge routers) 12 mutually connected to subscriber networks 16 categorized as existing networks and encapsulating IP packets from the subscriber networks into lightwave adaptation frames, and of an intra-network router (lightwave core router) 13 for executing an intra-network relay transfer process on a lightwave adaptation frame basis.

Further, the WDM used in the lightwave network is defined as a technology schemed to expand a transmission path capacity by multiplexing a plurality of wavelengths, and a physical link for connecting the lightwave routers to each other is termed a wavelength path. Then, each of the lightwave routers selects a wavelength with respect to the lightwave path statically extended within the lightwave network, whereby it is feasible to dynamically correspond to the wavelength path.

A lightwave network model according to the present invention is based on two hierarchies consisting of the lightwave access network 15 and the lightwave core network 14, and constructs a network exhibiting an integrated extendibility from the access network to a backbone.

The lightwave access network 15 is constructed of the lightwave edge routers 12 connected to each other via a wavelength path 18. The lightwave access network accommodates the multidimensional existing network 16, prescribed by the OSI (Open System Interconnection) Reference Model, such as IP (Internet Protocol), SDH (Synchronous Digital Hierarchy), ATM (Asynchronous Transfer Mode), and executes a terminating process of a layer 1, a layer 2 and a layer 3 in accordance with a protocol of the existing network 16.

Then, the lightwave core network 14 is constructed of the lightwave core routers 13 connected to each other via the wavelength path 18, and terminates only the layers 1 and 2.

In the lightwave network 17, the interconnections between the lightwave edge routers 12, between the lightwave core routers 13 and between the lightwave edge router 12 and the lightwave core router 13, are made respectively by the wavelength paths 18.

Furthermore, the lightwave network may be constructed through wavelength resources of an optical cross connect (OXC), an optical ADM (Add/Drop Multiplexer) and so forth in the existing WDM network, and it is also feasible to restrain an introduction cost corresponding to a compatibility with the existing infrastructure.

The lightwave network data communications system to be described according to the present invention has constructive elements, i.e., a lightwave router address available within the lightwave network, an aggregation flow obtained by aggregating individual IP flows from the subscribers into an intra-network flow, and a lightwave adaptation frame for encapsulating the lightwave router address and the aggregation flow. The lightwave network data communications system implements routing within the lightwave network, and further a superframe transfer mode is introduced for making an intra-network packet transfer efficient.

To start with, the lightwave router address will be explained.

The lightwave router address is defined as an address intrinsically set within the lightwave network, and given to the lightwave edge router 12 and the lightwave core router 13.

As known well, the IP address comes under a flat address system which is not hierarchized, and a physical position of a terminal thereof can not be specified simply by referring to the IP address.

Therefore, though a routing protocol process and an address resolution process are needed in each of nodes, the number of pass-through nodes increases in the large-scale basic network, and hence, if such a process is executed per via node, a throughput might decrease.

By contrast, according to the system of the present invention, the address resolution is confined to a resolution from the IP address to the lightwave router address in the lightwave edge router 12, and the address resolution is not required for an intra lightwave network transfer. Hence, it may be considered that the throughput of the whole network is enhanced by far higher than by directly dealing with the IP address.

The lightwave network is shielded by the lightwave edge routers 12 from other networks, and therefore the lightwave router address has an advantage of being managed independently by a network communications common carrier (which will hereinafter be simply refereed to as a network carrier) who operates the basic network. Besides, the routing protocol process and the address resolution process are unnecessary in the lightwave core router defined as an intra-network router within the lightwave network, and a high-speed/large-capacity process is actualized. It is feasible to reduce both a retrieval time and a size of a routing table by hierarchizing, when formed, the lightwave router addresses.

Next, a concept of an aggregation flow label of the present invention will be explained with reference to the drawings.

Figure 3:
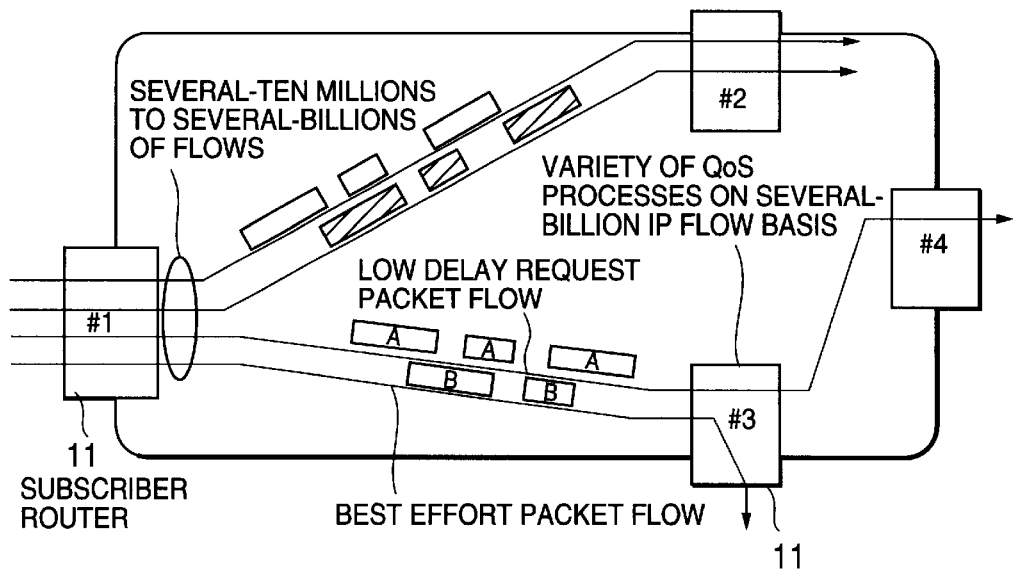
FIG. 3(a) is an operational conceptual diagram showing a conventional transfer operation model.
FIG. 3(b) is an operational conceptual diagram showing a transfer operation model when introducing an aggregated flow according to the present invention.
Figure 3:
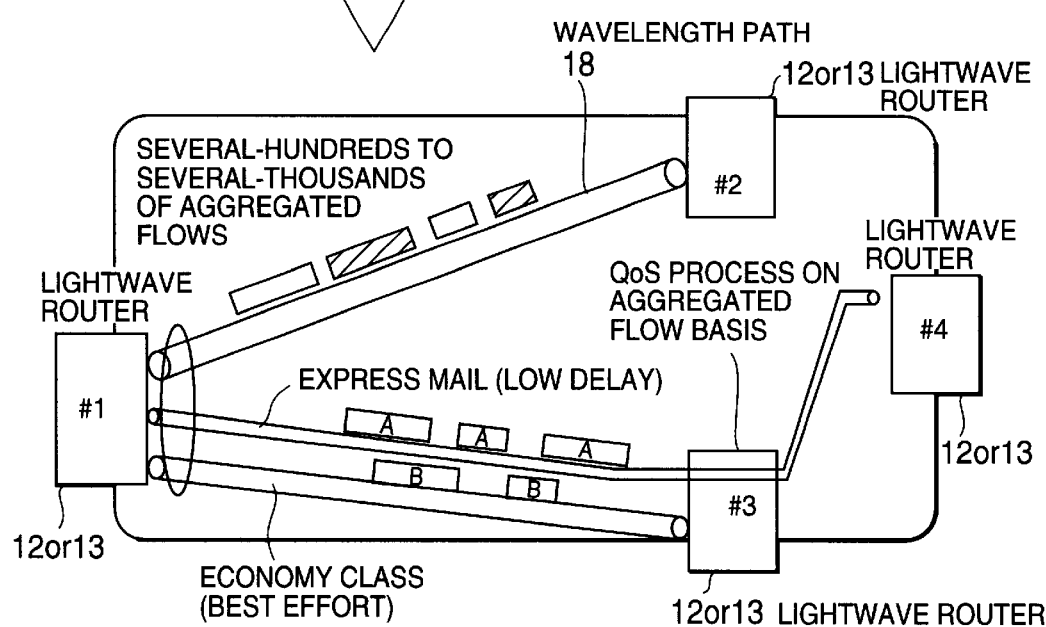

FIG. 3 is an operational conceptual diagram showing a transfer model when introducing the aggregation flow applied based on the present invention.

Figure 4:
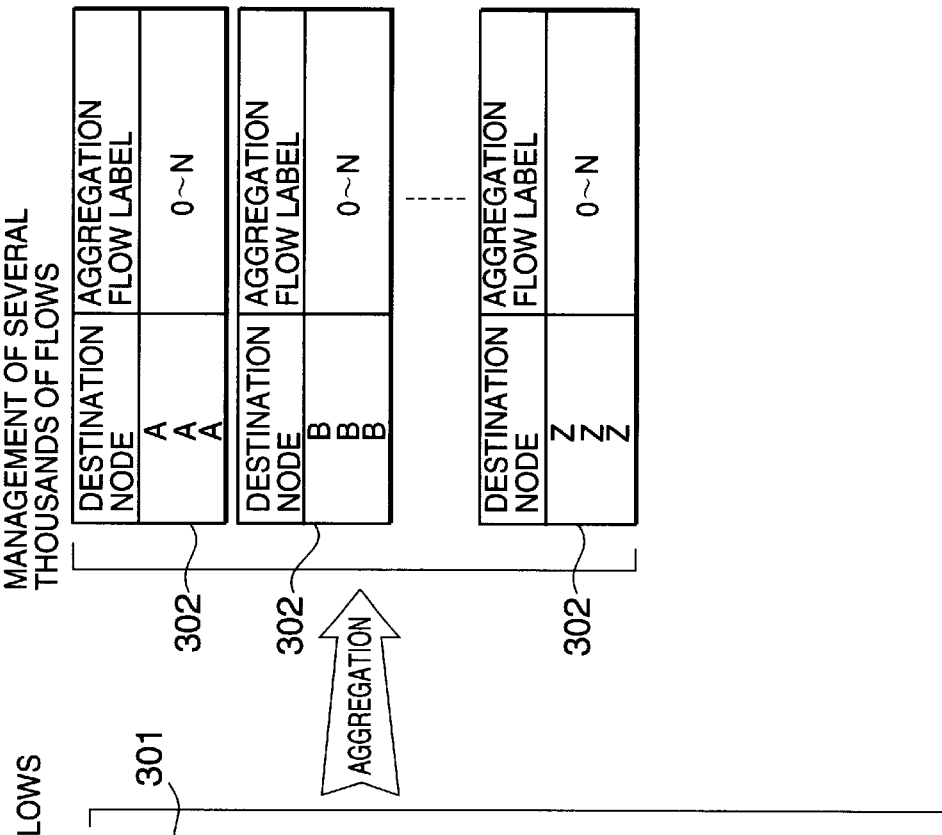
FIG. 4(a) is a chart showing a structural example of a flow management table for the conventional transfer operation.
FIG. 4(b) is a chart showing a structural example of a flow management table when introducing the aggregated flow according to the present invention.

FIG. 4 shows a structural example of a flow management table when introducing the aggregation flow applied based on the present invention.

In the prior art, for example, the number of IP flows in the process of transfer on a high-speed line based on OC-12 operating at 622 Mbit/sec which is defined as a SONET transmission channel, is as larger as 1 million, and a frequency at which the individual flow occurs or extinguishes is very unstable. If grasping the individual flows on an aggregated basis, however, it is a spread notion that the individual flow lasts for a considerably long period of time.

On the other hand, in differentiated services provided by the network carrier, the network transfer is differentiated corresponding to a QoS (Quality of Service) according to a contract category, a traffic classification, an application category and so on with respect to the individual IP flow, and it is a matter of importance to solve how the IP flows as many as several millions to several-ten millions per link are monitored and controlled and how the network QoS is assured.

As a contrivance for solving this problem, the concept of the aggregation flow is introduced in each of nodes such as the lightwave edge routers 12 and the lightwave core router 13 provided in within the lightwave network according to the present invention.

Next, a transfer of the aggregation flow and a structural example of the flow management table will be explained with reference to the drawings.

As shown in FIG. 3, a process of the lightwave router at an edge (marked with a node number #1 in FIG. 3) involves a function for monitoring the individual IP flows on the subscriber side, and mapping to a flow label (aggregation flow label) into which those IP flows are aggregated per a destination lightwave router address defined within the lightwave network.

For instance, as shown in FIG. 3(a), a subscriber router 11 serving as an edge router reads pieces of IP header information about the IP flows of which the number of occurrences per sec comes to several millions to several-ten millions, and determines a transfer destination of the IP flow by collating the respective pieces of information with the flow management table, thus transferring the transfer destination to within the network. Hence, there might arise a problem of causing a transfer delay due to a scale-up of the table as well as due to an increase in the retrieval time thereof.

As shown in FIG. 3(b), however, if using the concept of the aggregation flow, the subscriber router performs the aggregation on the basis of flows transferred to the same destination node, and hence the lightwave router 12 or 13 in the edge router of the present invention may determine a transfer destination on an aggregated flow basis, which is suited to a high-speed transfer in the large-scale network.

Further, in a flow management table 301 shown in FIG. 4(a) which corresponds to the conventional transfer operation in FIG. 3(a), for example, entries as many as several millions are required to be registered. In a flow management table 302 of the present invention which takes in the concept of the aggregated flow corresponding to what is shown in FIG. 3(b), however, every set of information is settled for each of aggregated flow labels 0 to N, whereby a storage area and the retrieval time can be largely reduced.

As discussed above, the lightwave edge router may simply monitor only the aggregated flow defined within the lightwave network, and therefore, even in the case of a very high-speed interface, the flow management can be simply attained.

Given next is an explanation of a lightwave adaptation frame for encapsulating a user packet and transferring it to the lightwave network.

The lightwave adaptation frame is a frame defined for giving the received user packet the above-described aggregated flow label and the lightwave router address and encapsulating the user packet in a frame for transferring to within the lightwave network, and serves to adapt the user packet to the lightwave network.

The lightwave adaptation frame and a framing process will hereinafter be described with reference to the drawings.

Figure 5:
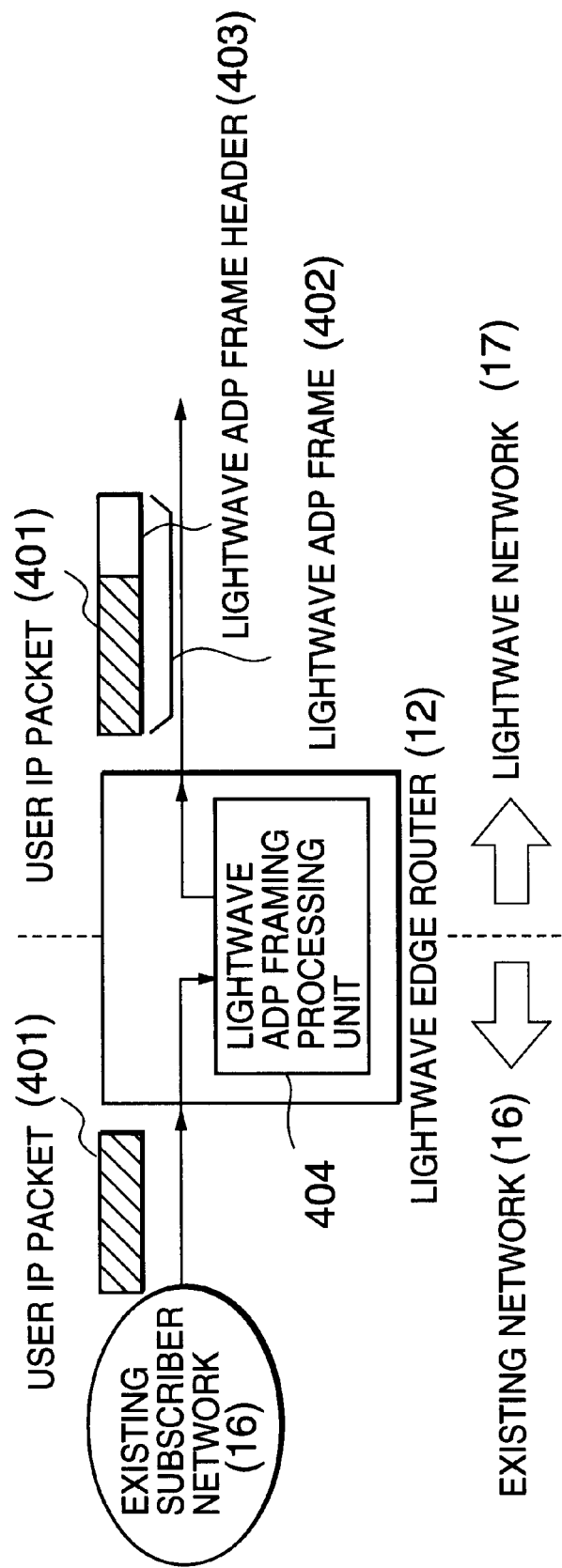
FIG. 5 is an operational conceptual diagram showing a procedure of encapsulation into a lightwave adaptation frame according to the embodiment of the present invention.

FIG. 5 is an operational conceptual diagram showing a procedure of encapsulation into the lightwave adaptation frame in the embodiment of the present invention, wherein there is shown a concept of encapsulating an IP version 6 (IPv6) frame defined as a user IP packet 401 into the lightwave adaptation frame (lightwave ADP frame) 402.

The encapsulation implies a process of storing an existing user packet, etc. in a data area of a different frame and forming a frame by attaching a new piece of header information. A transfer process after the encapsulation is executed based on a lightwave adaptation frame header (lightwave ADP frame header) 403 as the new header information, and a header of the user IP packet 401 stored in the data area is not referred to as a piece of destination information in the process of the transfer to within the lightwave network.

The lightwave adaptation frame 402 is structured to encapsulate in its header field the lightwave router address used as an intra-network address, the aggregated flow label used as an intra-network flow identifier and other intra-network service identification information, and is defined as an intermediate intra-network frame for adapting the IP packet to the SDH based on the WDM.

The lightwave adaptation frame 402, if being an intra-network frame capable of encapsulating the above-mentioned lightwave router address, the aggregated flow label and the intra-network service identifier, may come under any types of frame systems, however, according to the present invention, an embodiment is described, wherein the IPv6 frame is adopted as the lightwave adaptation frame 402.

An IPv6 frame format has an address field as sufficiently large as 16 bytes enough to store the lightwave router address. Further, the IPv6 address system, because of having a hierarchized address system, can be structured in a format suitable for an efficient routing process being aware of the positional information on the network, and is at the same time capable of scheming to downsize a routing table.

The great majority of subscriber packets existing at the present may be conceived as IPv4 packets, however, an encapsulation method in IPv4 is prescribed on standard in IPv6, if utilizing IPv6, the individual encapsulation method can be avoided. In addition, if IPv6 spreads in the future, there is an advantage of being capable of transferring without being aware of a contact point between the subscriber network and the lightwave network, and a header field in IPv6 is suited to a purpose for being used as the lightwave adaptation frame.

Next, the operation of encapsulating the user IP packet into the light adaptation frame will be explained.

As illustrated in FIG. 5, the user IP packet 401 flowing to the lightwave edge router 12 from the existing subscriber network 16 is encapsulated into the IPv6 frame adopted as the lightwave adaptation frame 402, and transferred to within the lightwave network 17.

Figure 6:
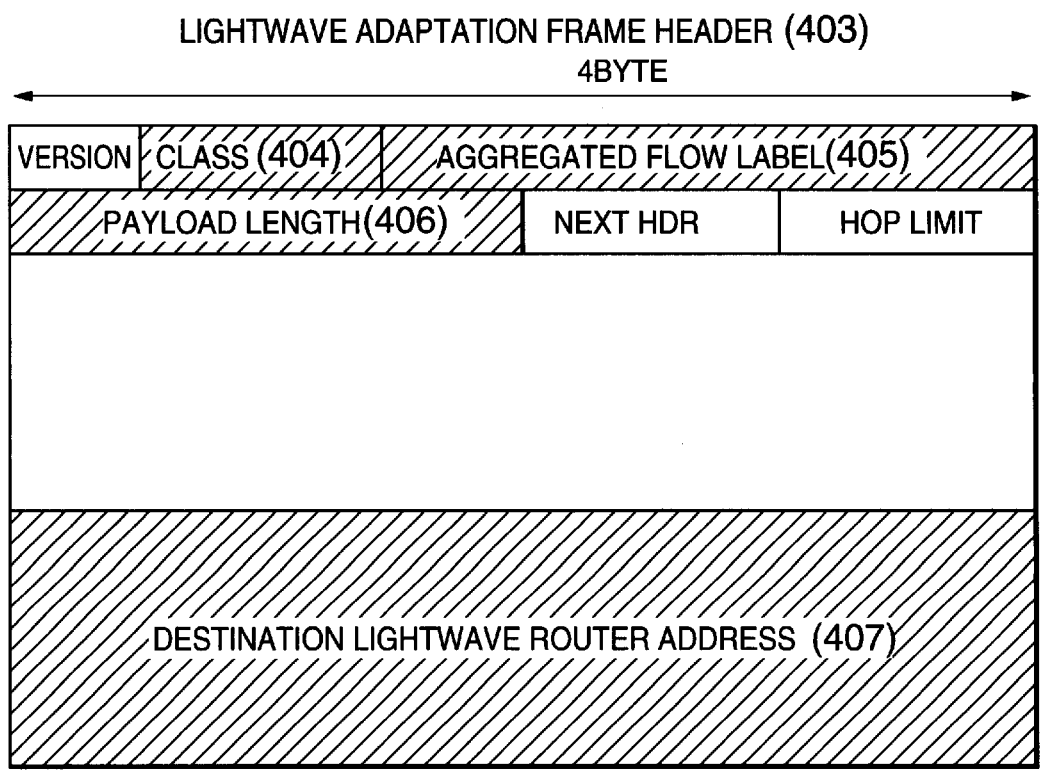
FIG. 6 is an explanatory diagram showing a structure of the lightwave adaptation frame according to the embodiment of the present invention.

A lightwave adaptation frame header 403 defined as a header field of the lightwave adaptation frame 402 is, as shown in FIG. 6, stored with a destination lightwave router address 407, an aggregated flow label 405, a class 404 serving as an intra-network QoS identifier, a payload length 406, etc., which are defined as parameters used within the lightwave network 17.

In a method of assembling the lightwave adaptation frame from the thus structured user packet 401, there exist a plurality of lightwave adaptation frame assembly modes corresponding to network topologies in which the lightwave edge routers 12 or the lightwave core router is provided.

Herein, the lightwave router according to the present invention prescribes two types of modes, i.e., a single frame mode and a superframe mode as framing modes into the lightwave adaptation frame as follows.

To be specific, the single frame mode is categorized as a mode in which every user packet is encapsulated into the lightwave adaptation frame, while the superframe mode is categorized as a mode in which the plurality of user packets belonging to the same aggregated flow are assembled as a single lightwave adaptation frame.

The framing modes of the present invention are summarized in FIG. 7.

FIG. 7 is an explanatory chart showing the framing modes in the embodiment of the present invention.

The respective lightwave adaptation frame modes and application forms thereof will be described with reference to FIGS. 7 and 1.

In the single frame mode, each user packet is encapsulated into the lightwave adaptation frame in a one-to-one relationship. Herein, an overhead based on the 40-bytes lightwave adaptation frame header is given to a least packet (what is prescribed in IP packet is 64 bytes at minimum), whereby the single frame mode is used in such a form that a link capacity of the lightwave network 17 can be sufficiently ensured. FIG. 1 shows an example in which the lightwave access network 15 is structured as a single frame transfer network.

In the superframe mode, the user packets 401 belonging to the same aggregated flow are rearranged, and big packets each having a length over a fixed length are encapsulated into the lightwave adaptation frame 402. Accordingly, the overhead process of the lightwave adaptation frame header is relieved. Then, the superframe mode is used in such a topology as to be connected to the lightwave core network 14 dealing with the frame of which the packet length is large.

Next, an intra lightwave network routing operation in each of the lightwave edge routers 12 and the lightwave core router 13, will be explained by use of the lightwave router address and the aggregated flow label introduced according to the present invention.

Figure 9:
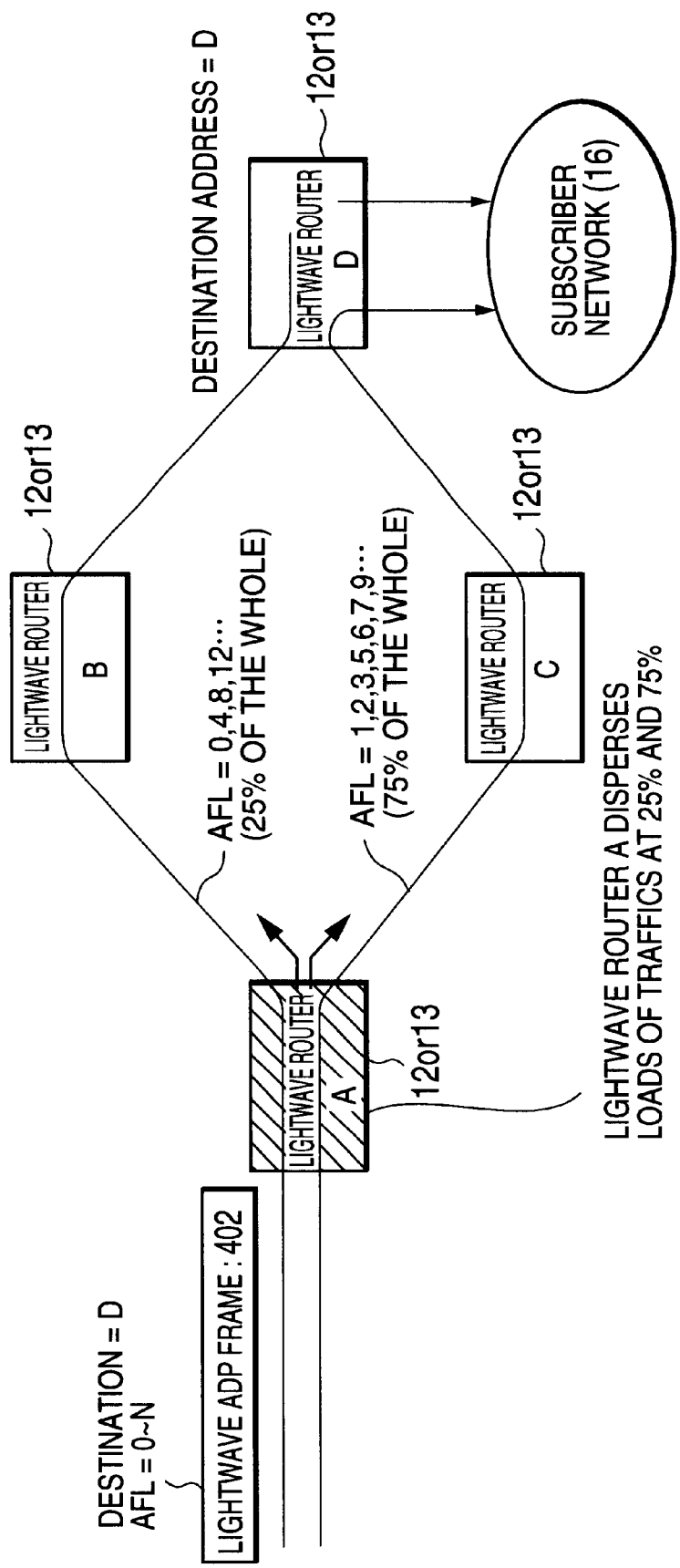
FIG. 9 is an operational conceptual diagram showing a traffic dispersion procedure on the AFL (aggregated flow label) basis (extended topology)

FIGS. 8 and 9 are explanatory diagrams each showing a packet transfer operation (deflection procedure) when introducing the aggregated flow.

FIG. 8 is the operational conceptual diagram showing a traffic dispersion procedure on an AFL (Aggregated Flow Label) basis. FIG. 9 shows an extension form of the traffic dispersion procedure in consideration of a deflection ratio.

In the lightwave network 17, the routing of the lightwave adaptation frame is performed based on the above-described destination lightwave router address and the aggregated flow label.

In the lightwave network 17, there exist a plurality of routes (wavelength paths) extending from a certain transmission-side lightwave router to a destination lightwave router, and one single adapted route is dynamically selected in terms of a traffic load condition of each route and an intra-network traffic design.

In the transfer example shown in FIG. 8, there is shown the deflection procedure when the packets forwarded to the same destination lightwave router D arrive at a lightwave router A.

As shown in FIG. 8, the route from the lightwave router A receiving the lightwave adaptation frame the router D is diverted in two ways, i.e., a route via a lightwave router B and a route via a lightwave router C.

At that time, the lightwave router A, with the aggregated flow label (AFL) of the received lightwave adaptation frame header field serving as a key, routes the lightwave adaptation frame of AFL=1 to the lightwave router B, and routes the lightwave adaptation frame of AFL=2 to the lightwave router C, referring to a routing table (which will be mentioned later on) possessed by the router A itself.

The transfer example in FIG. 9 is a partially extended version of the transfer example in FIG. 8, wherein the frames are deflected and transferred at a rate of 25% of the whole to the route via the lightwave router B and at a rate of 75% of the whole to the route via the lightwave router C with respect to the two types of route candidates.

Thus, the plurality of AFLs (Aggregated Flow Labels) are defined with respect to the same destination lightwave router address D, whereby the traffic dispersion on a minute-rate-basis can be attained.

Note that individual IP flow incorporates such a function that the same aggregated flow label is allocated till the flow is ended at an entrance edge of the lightwave network, and hence packet priorities are never disordered within the individual IP flow.

Next, a superframe transfer mode of storing one big frame with a plurality of frames belonging to the same aggregated flow and transferring this big frame in order to increase an intra-network transfer efficiency, will be described with reference to the drawings.

The superframe, which is prescribed by a frame length over a fixed length, will specifically be explained by exemplifying a case where a long packet length is prescribed on the basis of 1.5 K-bytes as the longest packet length in, e.g., Ethernet.

A long packet having a length over the prescribed length (1.5 K-bytes) is treated singly as a superframe, and transferred to within the lightwave network 17. On the other hand, a plurality of short packets of several-ten bytes to several-hundred bytes are assembled into one single superframe and thus transferred.

The encapsulation process into the lightwave adaptation frame (superframe) will be described referring to FIG. 10.

Figure 10:
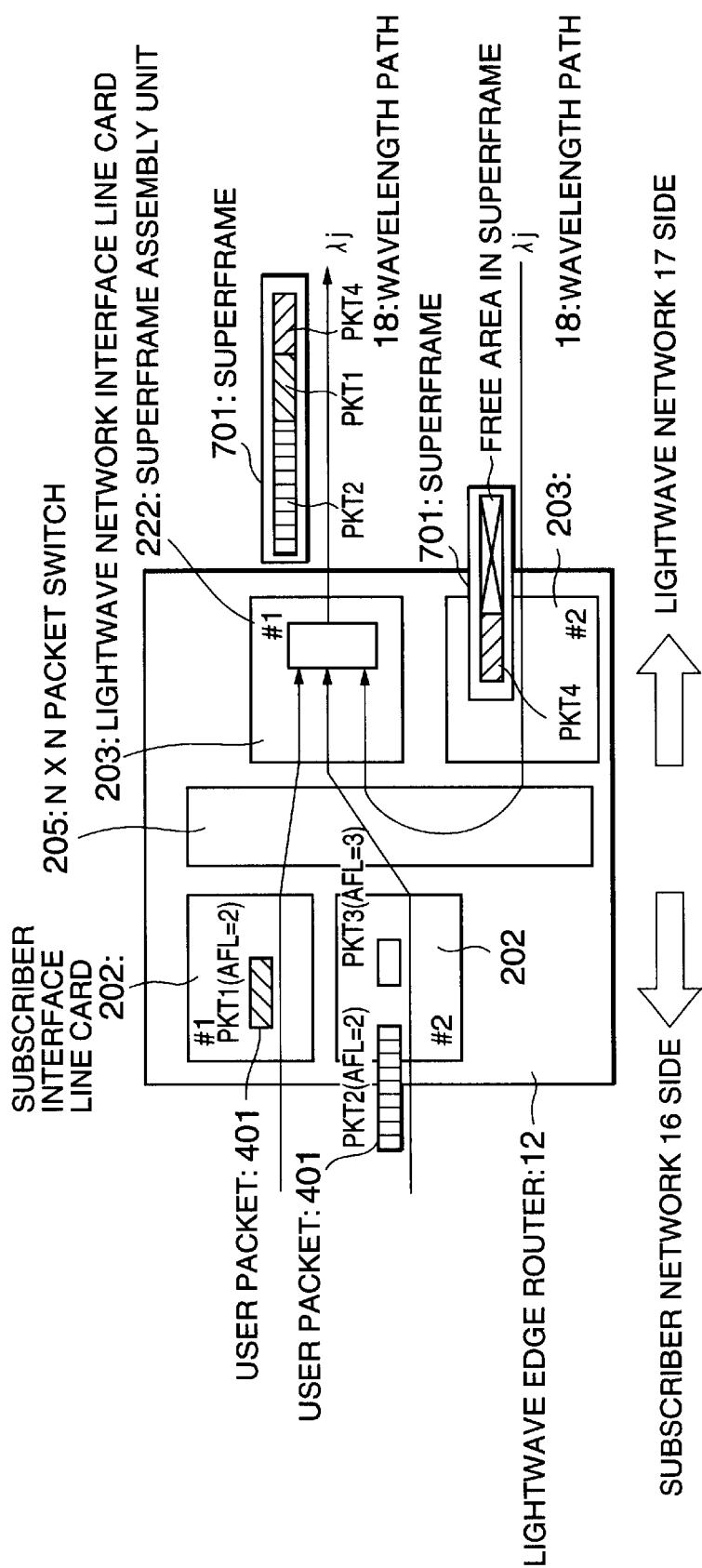
FIG. 10 is an operational conceptual diagram showing a process of encapsulation into the lightwave adaptation frame (superframe)

FIG. 10 is an operational conceptual diagram showing the encapsulation process into the lightwave adaptation frame (superframe).

The user packets forwarded to the same destination lightwave router and allocated with the same AFL are assembled into the superframes each having a length over the fixed length by a superframe assembly unit 222 of an output-side lightwave network interface line card 203.

In the example shown in FIG. 10, each of PKT_1 arriving at an interface number #1 of a subscriber interface line card 202, PKT_2 arriving at an interface number #2 thereof and PKT_4 arriving at an interface number #2 of the lightwave NWIF line card 203, holds AFL=2 as a lightwave adaptation frame header, which therefore indicates being re-assembled into a new superframe of AFL=2 by the superframe assembly unit 222 with the interface number #1 of the lightwave network interface line card 203 serving as an output destination via an N×N packet switch 205.

Next, a system architecture for actualizing a transfer mechanism in the lightwave network described above in the embodiment of the present invention, will be outlined.

Figure 2:
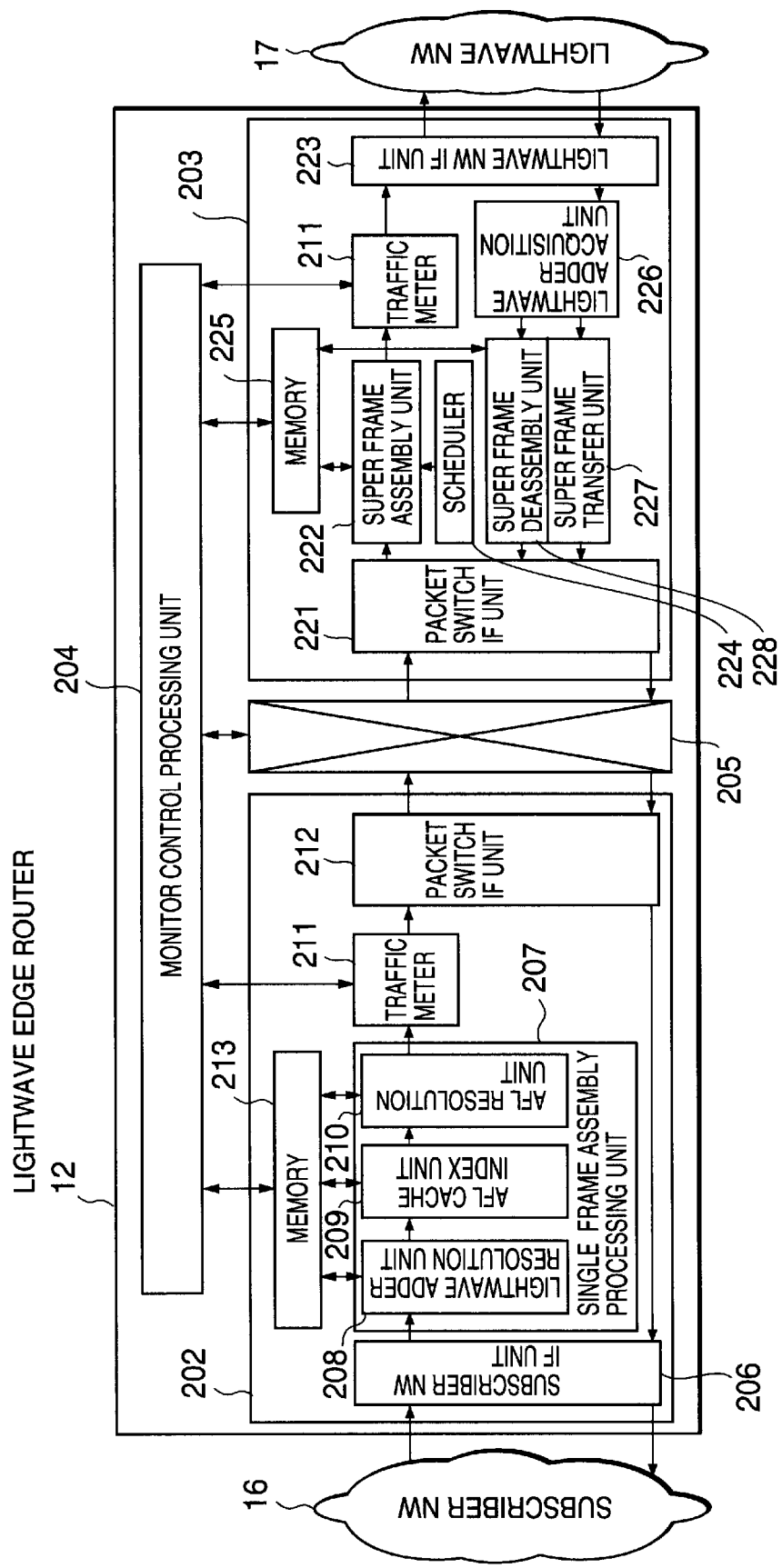
FIG. 2 is a principal block diagram showing a configuration of a lightwave edge router according to an embodiment of the present invention.

FIG. 2 is a principal block diagram showing a construction of the lightwave edge router applied according to the present invention.

The lightwave edge router 12 accommodates the subscriber network, and includes the subscriber interface line card 202 functioning as a gateway, the lightwave network interface line card 203 functioning as a connecting point to the lightwave network, the N×N packet switch 205, and a monitor control unit 204 functioning as an intra-system server.

While on the other hand, the lightwave core router 13 includes the lightwave network interface line card 203 having connection interfaces with the lightwave network at both of transmitting/receiving ports, the N×N packet switch 205, and the monitor control unit 204 functioning as the intra-system server, and has such a difference from the lightwave edge router 12 that the core router 13 does not include the subscriber interface line card 202.

Components of the subscriber interface line card 202 of the lightwave edge router will hereinafter be explained.

The subscriber interface line card 202 includes a subscriber network (NW) interface (IF) unit 206 for transmitting and receiving the user packets from the subscriber network 16, a single frame assembly processing unit 207 for encapsulating the user packets received from the subscriber network into a single frame defined as a one mode of the lightwave adaptation frame, and a memory 213 for storing the lightwave adaptation frame header 403 of each user packet which has been explained referring to FIG. 6 with a destination lightwave router address 407, an aggregated flow label 405, an intra-network QoS identifier 404 and a payload length 406 which are resolution target entries used for the transfer process in the lightwave network 17. The subscriber interface line card 202 further includes a traffic meter 211 for monitoring a transfer capacity per paired information of the destination lightwave router address 407 and the aggregated flow label 405, and a packet switch IF unit 212 incorporating a transmitting/receiving interface function with the packet switch.

Further, the single frame assembly processing unit 207 of the subscriber interface line card 202 is constructed of a lightwave address resolution unit 208 for resolving a destination address (e.g., an IP address) of the layer 3 in the OSI Reference Model and an lightwave router address corresponding to each destination address which are received from the subscriber network 16, an AFL resolution unit 210 for resolving the AFL allocated per lightwave router address resolved, and a cache index unit 209 for retaining and managing the transfer information belonging to the same aggregated flow with respect to the allocated AFL.

Furthermore, the traffic meter 211 includes a unit for monitoring an excessive traffic inflow large enough to exceed a transferable capacity set per AFL from the monitor control unit 204, and, if over the transferable capacity, feedback-controls a reading unit, and a unit for performing policing control of discarding the packet having the relevant AFL or lowering a readout priority.

Then, the packet switch IF unit 212 incorporates a function of executing transfer control of the packet switch 205 in order to provide the QoS requested through a scheduling function based on a WFQ (Weighted Fair Queuing) method of determining a transfer service frequency depending upon a network resource quantity allocated to the AFL to which the packets belong.

The WFQ method, which is a queuing technology of transferring the packets in accordance with a band allocation, is described in depth in, e.g., "Supporting Real Time Applications in an Integrated Services Packet Network: Architecture and Mechanism", written by D. D. Clark, et al., ACM SIGCOMM'92, and hence its detailed explanation is herein omitted.

Next, a packet transfer operation of the subscriber interface line card 202 will be described with reference to FIG. 11 and some other Figures.

Figure 11:
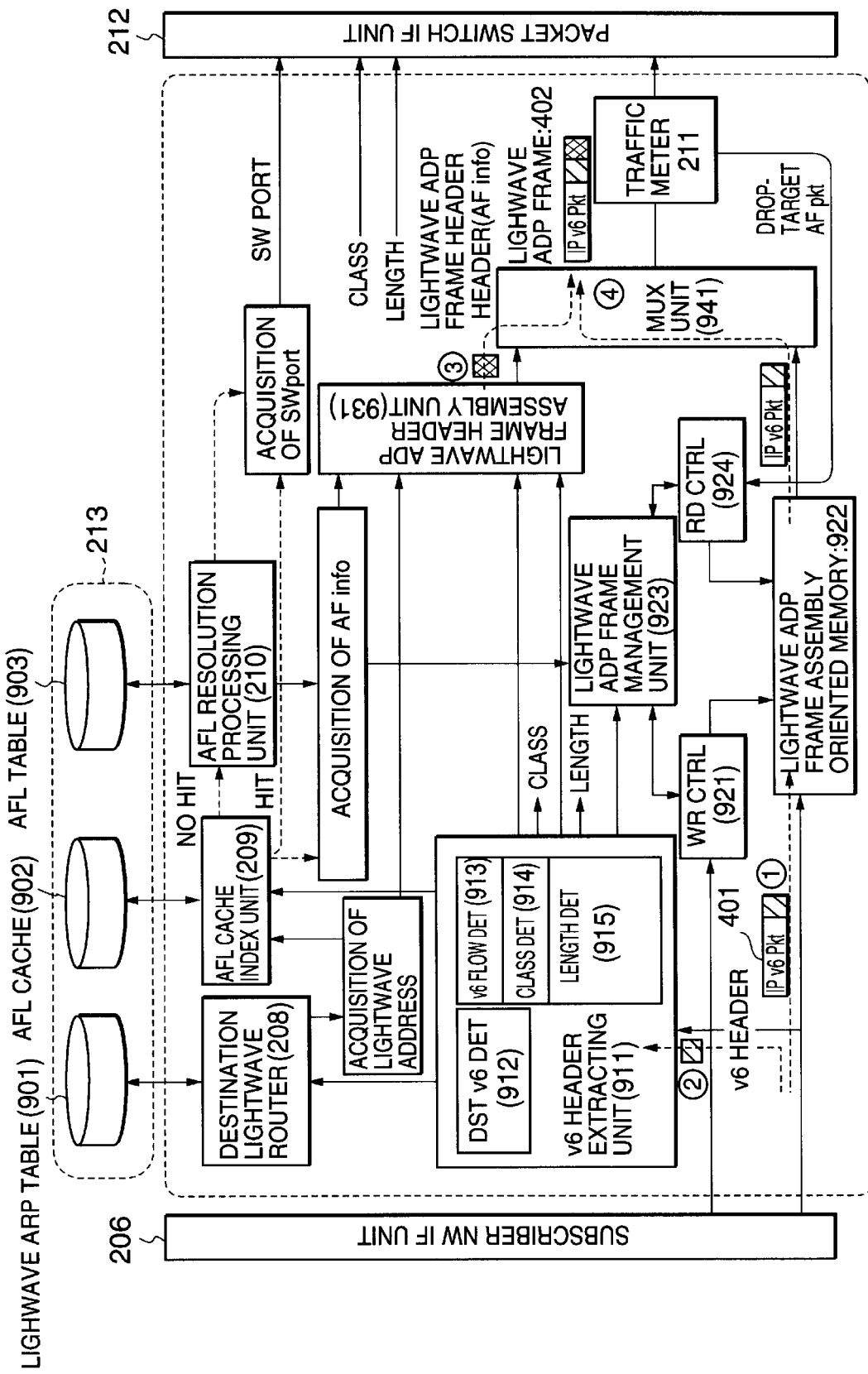
FIG. 11 is a functional block diagram showing a packet transfer process of a subscriber interface line card according to the embodiment of the present invention.

FIG. 11 is a functional block diagram showing the packet transfer process of the subscriber interface line card 202. FIG. 11 shows the detailed principal functional blocks taking charge of the packet transfer process, wherein the subscriber interface line card 202 is centered in the construction of the lightwave edge router shown in FIG. 2.

A structure and an operation of the subscriber interface line card 202 will hereinafter be explained in details.

To start with, a table structure and parameters needed in the respective processing blocks will be described referring to FIGS. 2 and 11.

Referring to FIG. 11, the memory 213 is constructed of a lightwave ARP table 901, an AFL cache 902 and an AFL table 903.

The lightwave ARP table 901 is a table for resolving only one lightwave router address within the lightwave network with an destination layer-3 address being used as a retrieval key in the subscriber interface line card 202 serving as an input edge to the lightwave network. More specifically, the lightwave ARP table 901 is stored with the number of address bits and the lightwave router address of the destination edge which are to be retrieved, wherein the destination address of the received IPv6 packet serves as a key. Then, the monitor control processing unit 204 downloads the table 901 via the system bus in accordance with an addition or deletion of the route such as changing the network topology, etc., thus properly updating the table 901 in a latest status.

The AFL table 903 is stored with an AFL defined as a corresponding piece of intra-network flow identification information and a switching destination port number, with the lightwave router address being used as a key.

Routing within the lightwave network is implemented based on the lightwave router address and the AFL, however, a plurality of routes extending from one transmission-side lightwave router to the destination lightwave router exist in the lightwave network, and one adaptable route is selected in terms of the traffic load condition of each route and the intra-network traffic design.

With respect to the same destination (lightwave router) and the subscriber interface line card 202 serving as the input edge to the lightwave network, a dynamic packet stream deflection transfer is effected on the AFL basis, and hence there are described an AFL allocated to a new flow, a switching destination port number corresponding to this AFL and a rate of deflection to the switching destination port number concerned. Then, the AFL and the switching destination port number are obtained with the resolved lightwave router address serving as a retrieval key.

The structure of the present table is managed in concentration by a wavelength path server unit (not shown, provided in the system, for managing a set rate depending on the network design and the traffic condition, and the server unit downloads the table to each subscriber interface line card.

Then, the subscriber interface line card, with respect to the first packet serving as a new flow, accesses the AFL table 903 each time, and allocates the resolved AFL and transmits it.

In regard to a subsequent IP flow belonging to the same aggregated flow, however, if transferring the packets by use of another alternative route, there might be a possibility in which the packet arriving sequence at the destination lightwave edge node is disordered. Therefore, because of a necessity for retaining the intra-network transfer route and the AFL as well, the memory 213 of the subscriber network interface line card 202 serving as the input edge to the lightwave network, includes an AFL cache 902 for the aggregated flow, and this AFL cache is constructed of, e.g., an associative memory (CAM: Content Addressable Memory).

The AFL cache table is stored with the lightwave router address as registration information (entry) thereof, the address information with the flow label information defined as an element for identifying the IP flow being used as a retrieval key, the AFL for identifying the intra-network flow as the corresponding data, the switching destination port number, and a timer flag till the entry is deleted.

Then, as for the IPv6 packet received from the subscriber router 11, the table of the AFL cache 902 is retrieved, wherein the lightwave router address after the address resolution and the paired information in a field segment (e.g., several bits of 20 bits) in the IPv6 flow label serve as retrieval keys. If there is no coincident entry, the AFL table 903 at the next stage is retrieved, the paired information of the switching destination port number and the AFL obtained by the above retrieval process is given and registered in the present CAM.

The present AFL cache table 902 is treated as a cache memory, and hence the contents of the table are retained for a fixed period of time by an aging timer and thereafter deleted. If read out by a timer end, the timer is refreshed, and the table contents are further retained for a fixed period of time.

Figure 12:
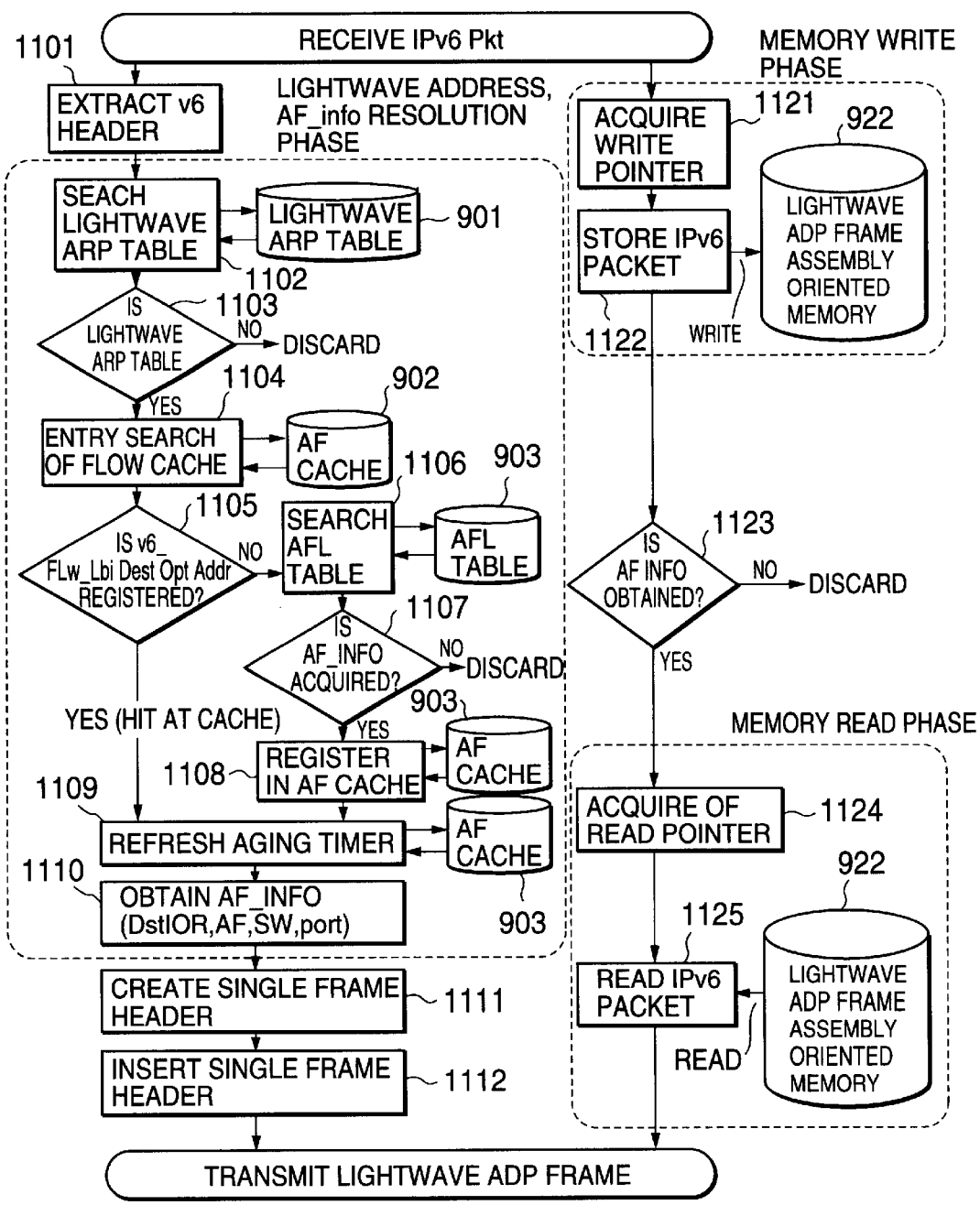
FIG. 12 is a flowchart showing a process of encapsulation into the lightwave adaptation frame in the subscriber interface line card according to the embodiment of the present invention.

FIG. 12 is a flowchart showing an encapsulation process into the lightwave adaptation frame in the subscriber interface line card.

The flowchart in FIG. 12 is roughly categorized into following four phases.

Memory Write Phase

A memory write phase is a phase for accumulating the IP packets received by the subscriber NWIF unit 206 in a lightwave adaptation frame assembly-oriented memory 922 in an arriving sequence. (steps 1121, 1122).

Lightwave Address, AF_INFO Resolution Phase

A lightwave address, AF_INFO resolution phase is a phase for obtaining, with a header extraction unit 911 extracting respective pieces of information (IPv6, Flow label, Dest IPv6 Addr) of the destination IPv6 address and the IPv6 flow label serving as retrieval keys, the destination lightwave router address, the AFL and the switching destination port number through the retrieval processes by the hardware of each table. (Steps 1102~1110)

Single Frame Assembly Phase

A single frame assembly phase is a phase in which a lightwave adaptation frame header structuring unit 931 structures a lightwave adaptation frame header where the destination lightwave router address obtained when resolving the address, the AFL, etc. are stored in predetermined fields in accordance with an IPv6 header format used for the lightwave adaptation frame header. (Steps 1111, 1112)

Memory Read Phase

A memory read phase is a phase in which the packets are read from the memory 922 in sequence from the packet of which the lightwave adaptation frame header has completely been structured, and the packet undergoes lightwave adaptation framing (IPv6 packet +OH 40B) in a MUX unit 941 and outputted to a packet switch IF unit 212. (Steps 1124, 1125)

Although the IP packets received in the roughly-categorized four processing phases are subjected to the lightwave adaptation framing as described above, what will be particularly herein explained in depth referring to FIG. 11 in combination in the case of the IP packet being defined as the IPv6 packet, is a process of an AF_INFO acquisition unit for acquiring an output destination switching port number and a specific aggregated flow label (AFL) of the lightwave adaptation frame from the header information of the IP packet received corresponding to the AF_INFO resolution phase as well as from the lightwave address described above.

When receiving the IPv6 packet 401 from the subscriber via the subscriber NWIF unit, the v6 header extraction unit 911 extracts an IPv6 packet header from the IPv6 packet received (step 1101), and the lightwave ARP table 901 is retrieved with the destination IP address contained in the header information being used as a key (step 1102).

Then, it is judged based on the information registered in the lightwave ARP table 901 whether or not the corresponding destination lightwave router address from the destination IP address, and, if unable to resolve the lightwave router address, this packet is discarded (step 1103: No).

Namely, in a normal carrier operation mode, when subscribing the communications services using the lightwave network, the lightwave router address for the subscriber IP address is set beforehand, and the case of being unable to resolve the lightwave router address as described above implies that the packet is not a packet received from the user of the normal subscription, or that the IP address value is invalid due to a data error caused when in transmission, with the result that the packet is to be discarded. The edge router having the gateway function described above executes the process of forwarding only the normal packets to the lightwave network.

Then, as to the packet of which the destination lightwave router address has been resolved (step 1103: Yes), with the paired information of the destination lightwave router address and the IPv6 packet flow label being as keys, the entry information in the cache 902 is further retrieved (step 1104), and the AFL and the switching destination port number as an output destination are resolved.

Herein, it is judged whether or not the IPv6 flow label and the destination lightwave router address have been already registered (Are v6_Flw_Lbi, Dest_Opt_Addr already registered?: step 1105), and, if the AFL and the switching destination port number defined as target entries corresponding thereto are obtained (step 1105: Yes), the AF cache aging timer is refreshed (step 1109). Then, the single frame header is created, and the AF_INFO acquisition phase is thus completed.

The process described above is a process about the IP packet received subsequently after the AFL information has already been registered in the cache with the heading packet, and, as for the subsequent packet, the AFL and the switching destination port number can be resolved by referring to the cache.

Whereas if neither the AFL nor the switching destination port information for the destination lightwave router address and the IPv6 flow label can be obtained (step 1105: No), with the destination lightwave router address serving as a key, the AFL table 903 is retrieved (step 1106), and a corresponding AFL (aggregated flow label) value is obtained.

If the AFL information consisting of the AFL and the switching destination port number can not be resolved by use of the AFL table 903 (step 1107: No), the packet concerned is discarded.

A specific example of being unable to resolve the AFL information by using the AFL table, may be exemplified such as an excessive congestion in the network, or improper updating of the AFL table information. In such a case, there is not the allocable AFL or switching destination port for the new flow relative to the destination lightwave router address concerned, the packet received can not be transmitted to within the lightwave network at a next stage.

Further, if unable to obtain the AFL and the switching destination port number by use of the AFL table (step 1107: Yes), the relevant information is made corresponding to the paired information of the IPv6 header flow label and the destination lightwave router address and thus registered in the AF cache 903 (step 1108).

Thereafter, the AF cache aging timer is refreshed (step 1109), and the single frame header is structured (step 1111), and the AF_INFO acquisition phase is completed.

As discussed above, the main function of the subscriber interface line card is to encapsulate the IP packets received into the single frame defined as the lightwave adaptation frame having the lightwave address and the AFL as well and transmit this single frame to the packet switch unit. Then, the method of resolving the AFL information thereof is that if the IP packet concerned belongs to the flow in which the very packet has ever been received, the AFL cache is referred to, and, if the belonging to a new aggregated flow which is not registered in the AFL cache, the AFL table is referred to, thereby resolving the AFL information.

Namely, the encapsulation into the lightwave adaptation frame with respect to the aggregated flow in which the AFL information has been once resolved and already transferred without being deleted by aging, may be done simply by referring to the cache memory hardwarewise, and the transfer process can be executed at a high speed.

Next, components of the lightwave network interface line card 203 will be explained with reference to FIG. 2.

To begin with, a transfer processing block extending from the packet switch 205 toward the lightwave NWIF unit 223 is described in sequence.

The transfer processing block is constructed of the packet switch IF unit 212 incorporating a transmitting/receiving interface function with the packet switch 205, the superframe assembly unit 222 for encapsulating the single frames received from the subscriber NWIF unit 206 into the superframe or further encapsulating the superframes received from the lightwave network interface line card 203, a scheduler 224 for controlling the transfer to the lightwave network even when the IP packets over what is prescribed are not inserted, the traffic meter 211, and the lightwave network (NW) interface (IF) unit 223 for transmitting and receiving the superframe to and from the lightwave network 17.

The traffic meter 211 and the packet switch IF unit 212 have the same functions as those in the subscriber interface line card 202.

Next, a configuration of a transfer processing block extending from the lightwave NWIF unit 223 toward the packet switch 205 will be described.

This transfer processing block is constructed of, in the lightwave network interface line card 203, the lightwave NWIF unit 223 incorporating the transmitting/receiving interface function with the lightwave network, a lightwave address acquisition unit 226 for acquiring the destination lightwave router address from the frame header of the superframe and checking whether or not this destination lightwave router address is a self-system address, a superframe transfer unit 227 for reading, if different from the self-system address transfer wavelength path for the destination lightwave address from the memory 225 and transferring the superframe to the relevant switch port, and a superframe deassembly unit 228 having a sub-unit for deassembling, if the destination lightwave address is coincident with the self-system address, the superframe along a payload length of the superframe, thus fetching the user packet, further executing the address resolution process based on the destination address of the packet header, and transferring the user packet to a corresponding switch port.

Figure 13:
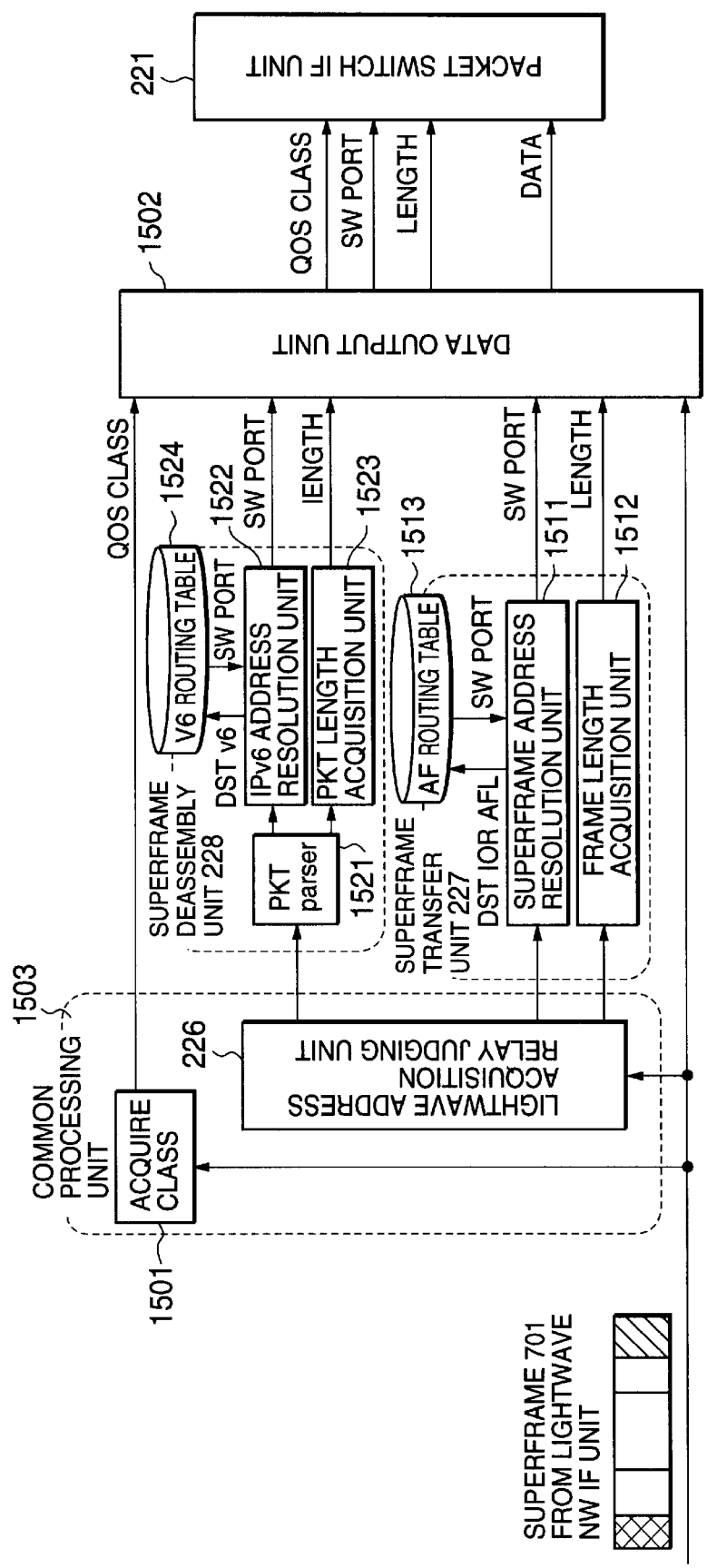
FIG. 13 is a principal explanatory diagram showing a receiving process from a lightwave network side according to the embodiment of the present invention.

Next, a superframe receiving process will be explained referring to FIG. 13. FIG. 13 is a principal explanatory diagram showing the receiving process from the lightwave network side in the embodiment of the present invention.

Upon receiving a superframe 701, a class acquisition unit 1501 acquires an intra-service class from a class field in the superframe header, and a relay judgement unit 226 refers to the destination lightwave router address in the superframe header.

Herein, if the destination lightwave router address is coincident with the lightwave router address, the superframe is deassembled into IPv6 packets, and the process is executed on an IPv6 packet basis. Whereas if the destination lightwave router address is not coincident with the lightwave router address, the superframe is transferred as it is.

The superframe transfer processing unit 227 operates as follows.

A superframe address resolution unit 1511 determines a lightwave network interface number (switch port) by referring to the destination lightwave router address and the AFL in the superframe header, and outputs this interface number to a data output unit 1502.

Further, a frame length acquisition unit 1512 acquires a frame length from the superframe header, and outputs the frame length to the data output unit.

On the other hand, the superframe deassembly processing unit 228 operates as follows.

A PKT parser 1521 deassembles and restores the superframe into the user packets by referring to the payload length in the IPv6 header.

The restoring process described above is carried out by referring to the payload length in the IPv6 header and identifying a delimitation of the IPv6 packet. Then, a version number and a validity of the next header are checked in order to confirm a normality of the deassembled packet. If unable to identify the packet delimitation midways due to an error in the payload length, the subsequent packets are discarded.

As for the restored IPv6 packet, the address resolution unit 1511 determines a switching destination port number to a transmission-side subscriber interface from the destination IP address in the IPv6 header, and outputs this port number to the data output unit 1502. A PKT length acquisition unit 1523 acquires a packet length from the packet length field in the IPv6 header, and outputs this packet length to the data output unit 1502.

The data output unit 1502 outputs a data length, a QoS class and a SW port to the packet switch IF unit 221 from packet data, an intra-network QoS class and an IPv6 packet process which are inputted from a common processing unit 1503, or from a switch port and a data length which are inputted through a superframe process.

The followings are advantages obtained by introducing the superframe described in the first embodiment of the present invention.

A first advantage is that the aggregated flow is the aggregation in the form of the lightwave adaptation frame, and the traffic transfer function in the lightwave network matches with the frame process.

A second advantage is that the packet is big enough to have a length over the fixed length, and therefore the routing process can be performed even in the case of high-speed interfaces of OC-192 operating at 10 Gbit/sec and OC-768 operating at 40 Gbit/sec in the SONET transmission system, whereby the large capacity switch can be constructed.

A third advantage is that the overhead (header length) based on the lightwave adaptation framing can be ignored. Note that the introduction of the superframe aims at reducing;the processing cost at the high-speed link terminal, actualizing the large-capacity switch in the lightwave core network 14, and so on. Accordingly, all the lightwave edge routers 12 do not necessarily incorporate the superframe function.

The assembly of the superframe, however, has the following problems.

A first problem is a point in terms of a payload activity ratio in the superframe.

A second problem is such a point that a delay occurs with the assembly of the superframe.

As to the first problem, there might be a possibility in which the link activity ratio decreases depending upon a total sum of the lengths of the plurality of IP packets contained in the superframe and upon a rate of the superframe length. For example, if a superframe having several-kilo bytes is assembled on a single several-ten-bytes IP packet basis, the link activity ratio in the lightwave network in which to transfer the superframe is extremely lowered enough not to effectively utilize the network band. Accordingly, the superframe must not be transferred to the lightwave network from the lightwave router till the total sum of the IP packet lengths which occupies the payload in the superframe becomes a fixed value or larger.

On the other hand, the second problem arises when the traffic to a certain aggregated flow is very low. The lightwave router is in the process of assembling the superframe for the above aggregated flow, however, if a subsequent traffic is small of quantity after the first IP packet has been inserted into the superframe, it is presumed that it might take a extremely long period of time till the superframe had been assembled and transferred to within the lightwave network.

A second embodiment for obviating the two problems given above will be discussed by way of an embodiment of extending the superframe, wherein a concept of share-ride is introduced.

The share-ride is a contrivance for setting a payload activity ratio of the superframe to a fixed value or over, and this method is called a share-ride scheme according to the present invention.

The share ride generally implies a share-ride bus used for carrying passengers at an airport terminal in North America to a common destination terminal.

The superframe is a frame defined corresponding to the aggregated flow. Pieces of information in the superframes sharing the aggregated flow and each exhibiting a low payload activity ratio, share-ride on one single superframe, and this single superframe is transferred, thereby scheming to increase the activity ratio of the superframe by encapsulating as many different IP packets as possible.

One embodiment of the share-ride scheme will be explained with reference to the drawings.

Figure 14:
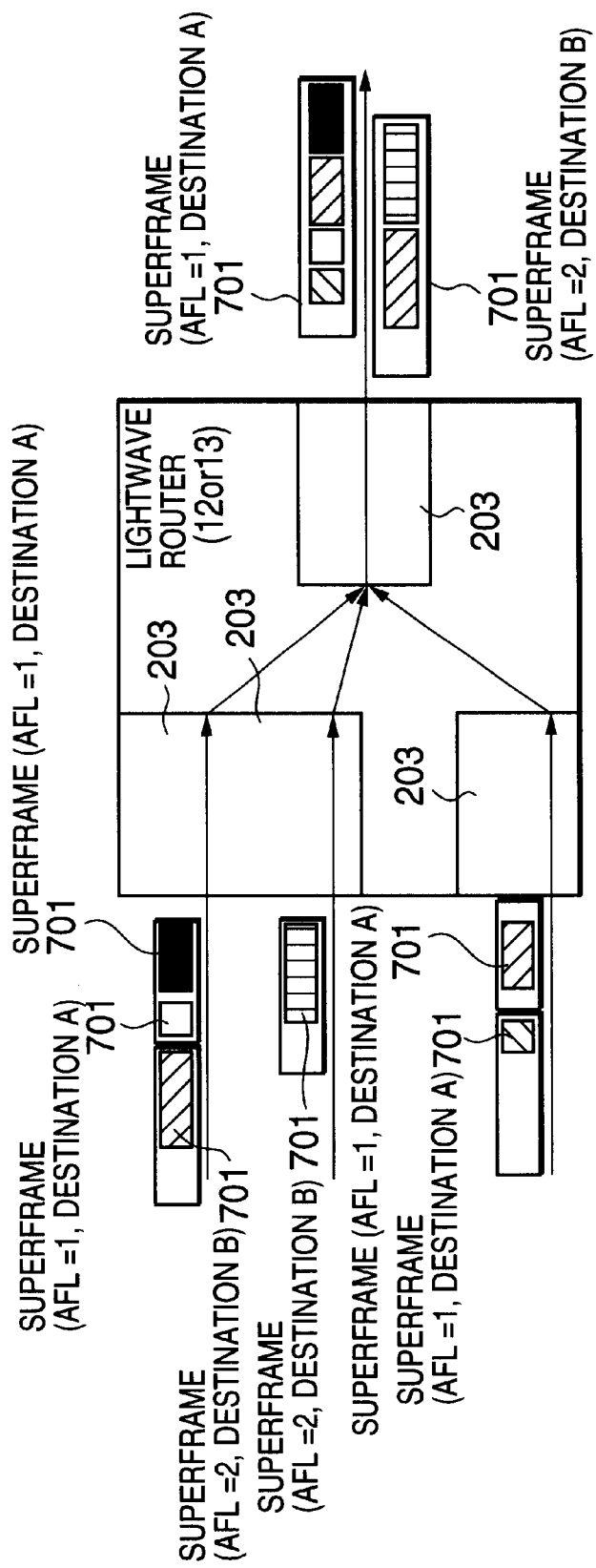
FIG. 14 is an explanatory diagram showing a transfer mechanism when a share-ride scheme is applied to within a lightwave router according to a second embodiment of the present invention.

FIG. 14 is an explanatory diagram showing a transfer mechanism when the share ride is applied to within the lightwave router.

Figure 15:
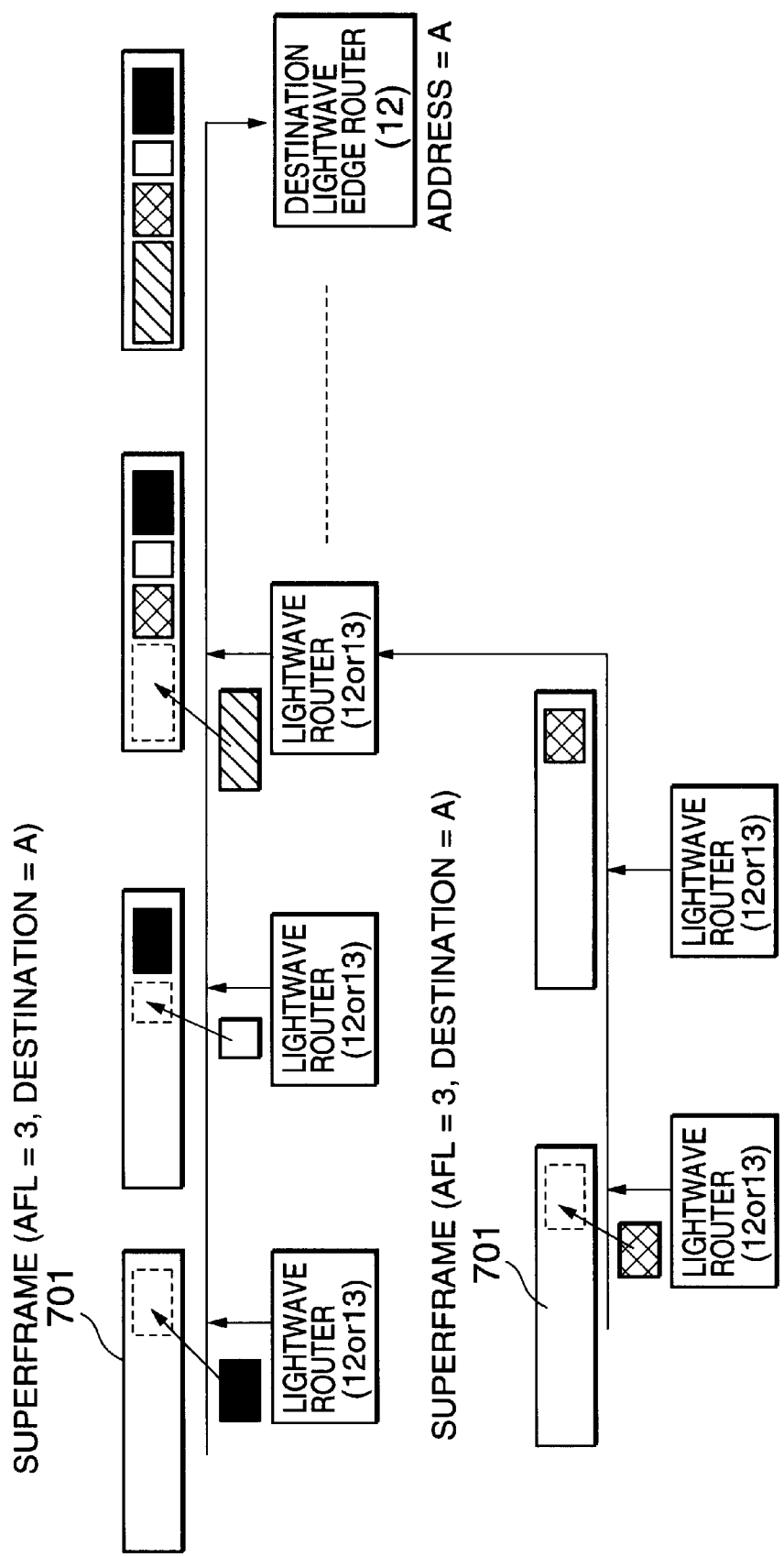
FIG. 15 is an explanatory diagram showing a transfer operation when the share-ride scheme is applied to between the lightwave routers, via which the frame is transferred, according to the present invention.

FIG. 15 is an explanatory diagram showing the transfer operation when the share ride is applied to between the lightwave routers via which the superframe is transferred.

As shown in FIG. 14, in the lightwave router, the superframe assembly unit 222 (FIG. 2) of the output interface unit to the lightwave network encapsulates the frames having the same destination lightwave router, and the same AFL into the superframe having a length over a fixed length, thereby scheming to increase a link activity ratio.

To be more specific, when there arrive a superframe group showing a destination A's AFL value=1 and a low packet encapsulation ratio and a superframe group having a destination B's AFL value=2, in the lightwave router receiving these superframe groups, the superframe groups are each reassembled into superframes showing AFL=1 relative to the destination A, and superframes showing AFL=2 relative to the destination B. Those superframes are transmitted to the lightwave network at a next stage.

FIG. 15 shows an operational example of merging the plurality of superframes each exhibiting the low packet encapsulation ratio and reassembling those superframes into a new superframe in the lightwave router located on the transfer route in the lightwave network to transfer them. The present invention has a mechanism by which the plurality of IP packets can share the superframe as a transfer container on the aggregated flow basis.

Moreover, in the embodiment of the present invention, a timer-assisted delay assurance function is incorporated for obviating a problem, wherein a delay might occur with the superframe assembly.

For instance, when introducing the share-ride in a case where the traffic to a certain aggregated flow is extremely low, there might exist such a case that the IP packets already inserted into the superframe are kept waiting for a long period of time in the lightwave router on the transfer route.

For preventing this stand-by state, a time-over of staying in the superframe assembly memory of the lightwave router is prescribed, and there is provided a unit for transferring onto the lightwave network the superframe staying over a fixed period of time even if the IP packets exceeding what is prescribed are not inserted.

Figure 16:
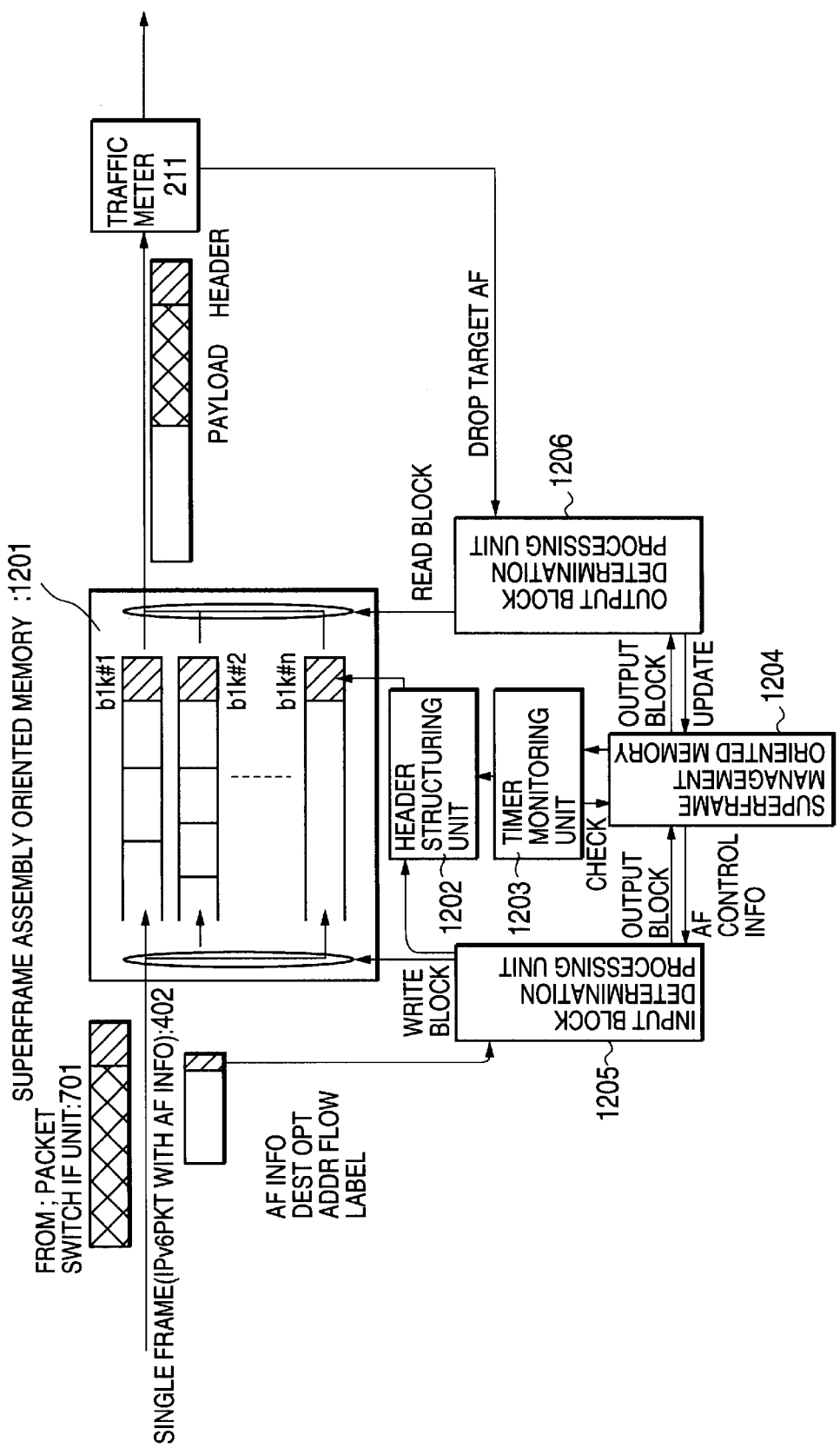
FIG. 16 is an principal explanatory diagram showing a superframe assembly unit of the lightwave network interface line card in the second embodiment of the present invention.

Referring next to FIG. 16, the operation of the lightwave network interface line card 203 of the lightwave core router which actualizes mainly the share-ride function, will be described in detail.

As already explained, the lightwave core router 13 includes the lightwave network interface line card having a connection interface at both of the transmitting/receiving ports with the lightwave network, the N×N packet switch 205, and the monitor control unit 204 functioning as an intra-system server. The lightwave core router 13 has a difference in configuration from he lightwave edge router 12, in which the router 13 does not include the subscriber interface line card 202.

FIG. 16 is a principal explanatory diagram showing the superframe assembly unit 222 of the lightwave network interface line card.

In the lightwave network interface line card, for performing the high-speed transfer within the lightwave core network by reducing the overhead process, the packets belonging to the same aggregated flow and each having a packet length under a fixed length are inserted by pluralities in the payload unit of the superframe having a large frame length and thus transferred to within the lightwave network in order to speed up the processing.

The superframe assembly unit 222 is constructed of a superframe assembly oriented memory 1201, an input block determination processing unit 1205, an output block determination processing unit 1206, a super frame management oriented memory 1204, a header structuring unit 1202, and a timer monitor unit 1203.

Then, when the IPv6 packets coming from the subscriber network 16 or the superframe from the lightwave network 17 are inputted via the packet switch 205, the input block determination processing unit 1205 extracts the destination lightwave router address and the AFL, and accumulates them per AFL in the superframe assembly oriented memory 1201.

If a quantity of the packet data accumulated exceeds the prescribed length (1.5 K-bytes) of the superframe, the input block determination processing unit 1205 notifies the header structuring unit 1202 of this effect, and a header for the superframe is structured and added to an output block list 1302 of the superframe management oriented memory 1204. Further, normally, when receiving the superframe of which the payload length exceeds the prescribed length (1.5 K-bytes), this superframe is added directly to the output block list 1302.

The timer monitor unit 1203 monitors a time-out with respect to the superframes in the process of the accumulation, and the superframe with an occurrence of the time-out is, even if the payload length thereof is under the prescribed length (1.5 K-bytes), added to the output block list 1302.

The output block determination processing unit 1206, based on the output block list 1302 read from the superframe management oriented memory 1204, reads the superframes sequentially from the superframe assembly oriented memory 1201.

Next, a configuration of the superframe assembly oriented memory will be explained.

Figure 17:
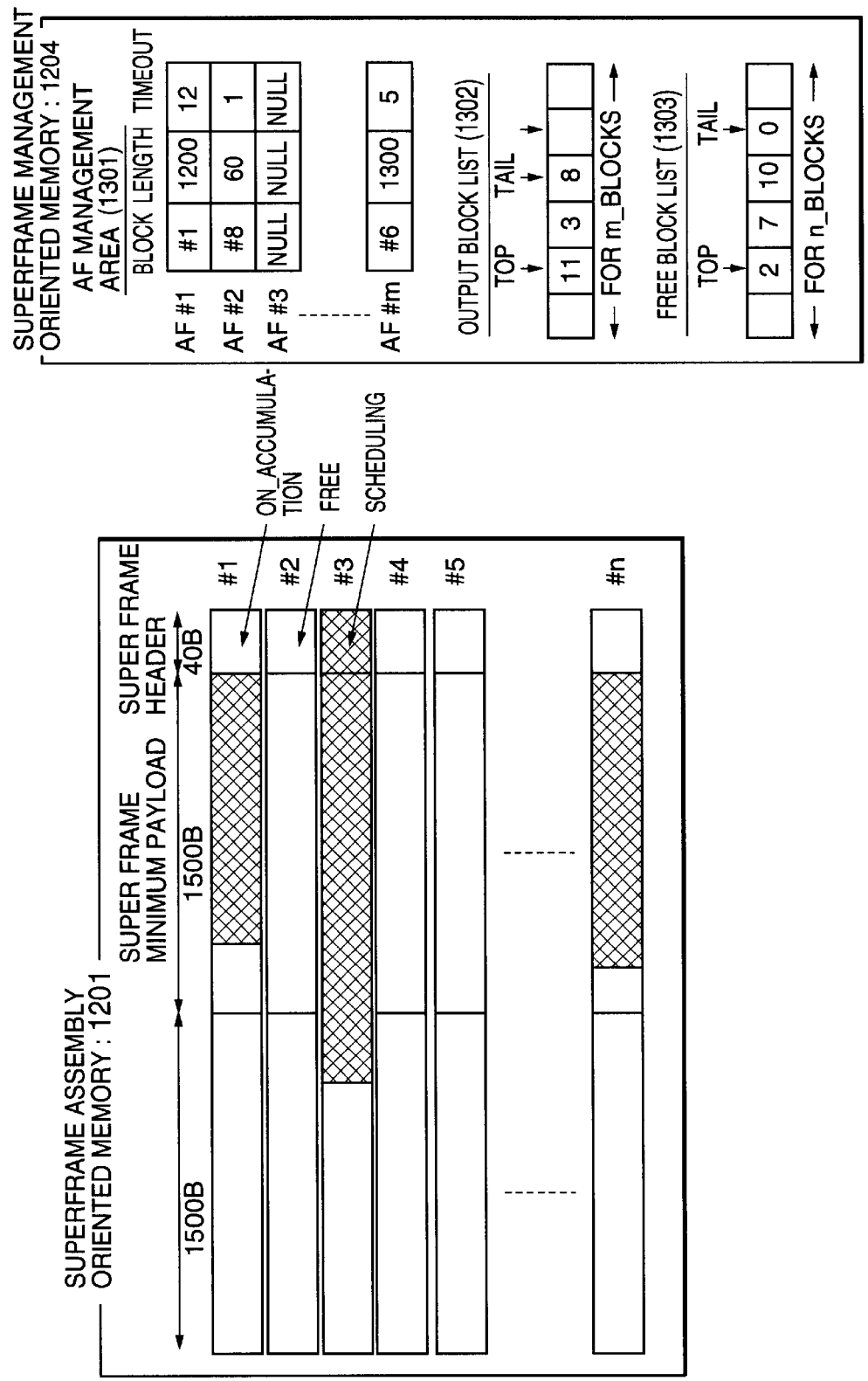
FIG. 17 is a principal explanatory diagram showing configurations of a management unit and a lightwave adaptation frame assembly oriented memory in the second embodiment of the present invention.

FIG. 17 is an explanatory diagram showing the structure of each memory format used for assembling the superframe. The configuration of the superframe assembly oriented memory will be described with reference to FIG. 17.

The superframe assembly oriented memory is constructed of two types of memories, i.e., the superframe assembly oriented memory 1201 for storing the data received, and the superframe management oriented memory 1204 for controlling the input and output of the packet data.

The superframe assembly oriented memory 1201 is constructed of n-pieces of blocks each having {(the prescribed length: 1500×2+overhead (40B)) bytes as one block, and one single superframe is stored in each block.

The superframe management oriented memory.1204 is constructed of an AF management area 1301, and an output block list 1302 defined as a list of the blocks to be outputted, and a free block list 1303 defined as a list of the blocks stored with no data.

The AF management area 1301 manages the information per AF number when accumulating the packet data, and has as its components a block for storing the data, a quantity (length) of the data stored at present, and a time (time-out) till the data is added to the output block list 1302 after the time-out.

Herein, the AF number like AF#1, etc. implies, e.g., a memory address, and is a management number for managing each aggregated flow locally within the system as well as being an identifier for univocally identifying the flow prescribed by the destination lightwave router and the AFL within the system.

Further, the input block determination processing unit 1205 adds the assembled superframe to a tail of the output block list 1302, and sequentially executes the output process thereof.

The timer monitor unit 1203 decrements the time-out in the AF management area 1301 at a fixed interval. Then, when decremented, an item of the AF number with the time-out value becoming 0 is judged to be the one exceeding the time-out time, and the data in the process of being accumulated are super-framed and thus transferred.

The processing procedures on that occasion may be a procedure of notifying the header structuring unit 1202 of the superframe assembly, a procedure of adding the relevant block to the output block list 1302, a procedure of initializing a relevant segment in the AF management area 1301, and a procedure of making the output block determination processing unit 1206 transfer the superframes in the sequence of the blocks designated by the output block list 1302 in the superframe management oriented memory. The blocks with a completion of the transfer are added to the tail of the free block list 1303.

Next, a flow of encapsulation process into the lightwave adaptation frame (superframe) in the lightwave network interface line card, will be explained referring to FIG. 18.

Figure 18:
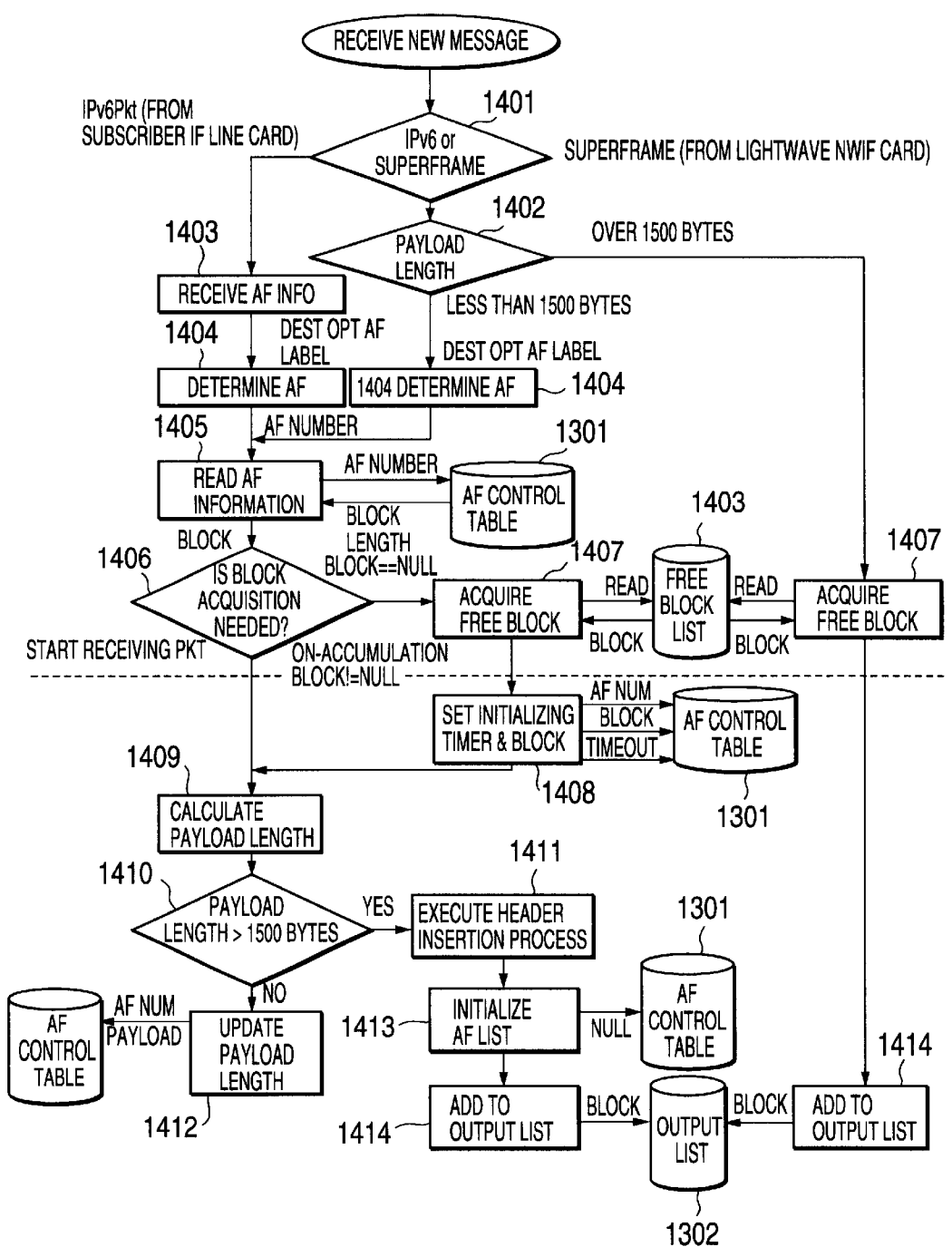
FIG. 18 is a flowchart showing a process of encapsulation into the superframe in a lightwave network interface card in the second embodiment of the present invention.

FIG. 18 is a flowchart showing the encapsulation process into the superframe.

The flow of the input block process largely diverts in two ways corresponding to categories of the data received.

When judging that the superframe is received (step 1401: receipt of superframe) and that the superframe of which the payload length is over the prescribed length (1.5 K-bytes) arrives (step 1402: over 1.5 Kbytes), the superframe is transferred directly to the lightwave network without being reassembled.

The following is the processing procedure for the received superframe having the length over the prescribed length.

A free block is obtained from the free block list, and the superframe is transferred to the free block (step 1407).

The free block is added to the tail of the output block list (step 1414).

While on the other hand, if the received data is judged to be the IPv6 packet in step 1401, or if judging that the superframe of which the payload length is less than 1.5 K-bytes arrives in step 1402, the superframes are accumulated till over the prescribed length (1.5 K-bytes). Then, after adding the superframe header, the superframe is transferred to the lightwave network.

The following is the processing procedure for the received superframe having the length less than the prescribed length.

The destination lightwave router address and the AFL information of the single frame are read, or alternatively the destination lightwave router address and the AFL information of the superframe are read from the jeader of the superframes (step 1403), and an AF number corresponding thereto is acquired (step 1404).

The information block corresponding to the AF number is read from the AF management table 1301 (step 1405).

If the free block is not set (step 1406: No), a free block is obtained from the free block list (step 1407), and set together with a time-out initial value in the AF management table 1301 (step 1408).

The payload length of the superframe is calculated from the quantity of the data accumulated in the block at present and from the data length of the data received (step 1409).

If the payload length is less than 1.5 K-bytes (step 1410: No), the payload length in the AF management table 1301 is updated (step 1412), and the processing comes to an end.

Whereas if the payload length exceeds 1.5 K-bytes (step 1410: Yes), the header structuring unit is notified of structuring the superframe header (step 1411), and the item of the relevant AF number in the AF management table 1301 is initialized (step 1413). Then, the relevant block is added to the tail of the output block list (step 1414).

As discussed above, in accordance with the second embodiment of the present invention, the superframe & share-ride scheme is introduced, thereby acquiring statistic multiple effects of the packet level in the lightwave network.

Further, for obviating the problem in which the delay occurs with the superframe assembly, the timer-assisted delay assurance function is incorporated, and, when introducing the share-ride scheme in the case where the traffic to a certain aggregated flow is extremely low, there is such a case that the IP packets already inserted into the superframe are kept waiting for a long period of time in the lightwave router on the transfer route. For preventing this stand-by state, the time-over of staying in the superframe assembly memory of the lightwave router is prescribed, and there is provided the unit for transferring onto the lightwave network the superframe staying over the fixed period of time even if the IP packets exceeding what is prescribed are not inserted. The occurrence of the delay longer than the fixed time can be thereby prevented.

The present invention has the effect in which the statistic multiple effect of the packet level can be acquired in the lightwave network. The reason why acquired is that the "lightwave adaptation layer" in one embodiment of the present invention is defined, the "superframe & share-ride scheme" is introduced, and the individual IP flows from the subscribers are aggregated. The followings are advantages obtained by introducing the "superframe & share-ride scheme".

A first advantage is that the aggregated flow is the aggregation in the form of the lightwave frame, and hence the traffic transfer function in the lightwave network matches with the frame process.

A second advantage is that the packet is big enough to have a length over the fixed length, and therefore the routing process can be performed even in the case of high-speed interfaces of OC-192 and OC-768. As compared with the method of dealing with the IP packet as they are, there is shown a jump in scheduling judgement time as fast as superframe length/64 bytes, whereby the large capacity switch can be constructed.

A third advantage is that the overhead (header length) based on the lightwave adaptation framing can be ignored, and so on.

Note that the introduction of the superframe aims at reducing the processing cost at the high-speed link terminal, actualizing the large-capacity switch in the lightwave core network 14, and so forth. Accordingly, all the lightwave edge routers 12 do not necessarily incorporate the superframe function.

What is claimed is:

1. A lightwave network data communications system in a lightwave network accommodating an existing subscriber network, comprising:

a lightwave access network for terminating layer 1 to 3 protocols with respect to a protocol of the existing network; and a lightwave core network, connected to said lightwave access network, for terminating the layer 1 protocol and the layer 2 protocol, wherein said lightwave access network converts a user packet of the terminated layer 3 into a lightwave adaptation layer of the layer 2 for transferring the packet matching with a synchronous digital hierarchy using a wavelength division multiplexing technology in the physical layer, wherein said lightwave access network includes a lightwave edge router for converting the user packets coming from the existing subscriber network and transferring the converted user packets to said lightwave core network;

said lightwave core network includes a lightwave core router for executing a relay transfer process, and said lightwave edge router and said lightwave core router aggregate the user packets on the basis of QoS information prescribed in a lightwave router address as an address set to the lightwave network transfer and the user packet, and execute an intra-network routing process with respect to each of said lightwave edge router and said lightwave core router, wherein said lightwave edge router accommodates the existing subscriber network, and has a subscriber interface line card for converting a different type of network protocol and a lightwave network interface line card functioning as a connection point to the lightwave network, said lightwave network line card includes a lightwave adaptation frame assembly processing unit for obtaining a destination lightwave router address representing an address of a destination edge router in the lightwave network and an aggregated flow label for managing in aggregation transfer routes for the user packets having the destination addresses from the QoS information and the destination addresses of the user packets received from subscribers, encapsulating the user packets into a lightwave adaptation frame with the lightwave router address and the aggregated flow label contained in header information, and transmitting the lightwave adaptation frame to said lightwave core network.

2. A lightwave network data communications system according to claim 1, wherein said lightwave adaptation frame assembly processing unit, as processing memories for executing an interface process with the subscriber network, includes:

a lightwave ARP table for resolving the destination lightwave from the destination address received;

an AFL table for aggregating a plurality of IP flows corresponding to the destination lightwave router addresses, storing a plurality of aggregated flow labels (AFLs) for routing within the lightwave network and output destination port numbers, and resolving an AFL for a new aggregated flow; and an AFL cache for retaining the output destination port number, the AFL and the lightwave router address for the aggregated flow with the AFL already determined, said AFL cache being referred to for executing a transfer process of subsequent IP packets, and said lightwave adaptation frame assembly processing unit assembles the lightwave adaptation frame by referring to said processing memories.

3. A lightwave network data communications system in a lightwave network accommodating an existing subscriber network, comprising:

a lightwave access network for terminating layer 1 to 3 protocols with respect to a protocol of the existing network; and a lightwave core network, connected to said lightwave access network, for terminating the layer 1 protocol and the layer 2 protocol, wherein said lightwave access network converts a user packet of the terminated layer 3 into a lightwave adaptation layer of the layer 2 for transferring the packet matching with a synchronous digital hierarchy using a wavelength division multiplexing technology in the physical layer, wherein said lightwave access network includes a lightwave edge router for converting the user packets coming from the existing subscriber network and transferring the converted user packets to said lightwave core network;

said lightwave core network includes a lightwave core router for executing a relay transfer process, and said lightwave edge router and said lightwave core router aggregate the user packets on the basis of QoS information prescribed in a lightwave router address as an address set to the lightwave network transfer and the user packet, and execute an intra-network routing process with respect to each of said lightwave edge router and said lightwave core router, wherein said lightwave edge router has a superframe assembly processing unit for encapsulating, if a data length of the user packet received from the subscriber is over a fixed length, this one packet intact into a single frame as one lightwave adaptation frame and transferring the single frame to a posterior stage, and, if the data length of each of the user packets is less than the fixed length, encapsulating batchwise a plurality of user packets belonging to the same aggregated flow in a data area into a superframe having a large data length and transferring this superframe to the posterior stage.

4. A lightwave network data communications system according to claim 3, wherein said superframe assembly processing unit includes:

means for extracting AFLs and destination lightwave router addresses of the lightwave adaptation frames inputted, and accumulating them in a superframe assembly oriented memory per AFL;

means for encapsulating, if the data accumulated in said superframe assembly oriented memory are large enough to exceed a predetermined prescribed length of the superframe, these pieces of data into one single superframe, then giving a header thereto and outputting the superframe to a posterior stage; and means for monitoring a time-out with respect to the packet data per AFL in the process of being accumulated, and outputting the superframe with an occurrence of the time-out to the posterior stage even if a payload length thereof is under the prescribed length.

5. A lightwave network data communications system according to claim 4, wherein said superframe assembly processing unit has said superframe assembly oriented memory and a superframe management oriented memory for controlling an output and an input of the frame, said superframe management oriented memory includes an AF management table for storing an information block number for storing data, a stored data quantity and a time-out value per AF number univocally identified from the AFL and the destination lightwave router address; an output block list for storing blocks for executing an output process of the assembled superframe in an output sequence; and a free block list for storing a list of the blocks stored with no data; and said superframe assembly processing unit reads from said AF management table an information block having an AF number for the received frame, adds the received frame to a data length, if the data length after being added is less than a prescribed length, updates the data length of said AF management table, whereas if the added data length exceeds the prescribed length, creates superframe header information for the relevant information block, adds the superframe header information to said output block list, then initializes an item of the AF number concerned, and adds the block with a completion of the output process to said free block list.

6. A lightwave network data communications system in a lightwave network accommodating an existing subscriber network, comprising:

a lightwave access network for terminating layer 1 to 3 protocols with respect to a protocol of the existing network; and a lightwave core network, connected to said lightwave access network, for terminating the layer 1 protocol and the layer 2 protocol, wherein said lightwave access network converts a user packet of the terminated layer 3 into a lightwave adaptation layer of the layer 2 for transferring the packet matching with a synchronous digital hierarchy using a wavelength division multiplexing technology in the physical layer, wherein said lightwave access network includes a lightwave edge router for converting the user packets coming from the existing subscriber network and transferring the converted user packets to said lightwave core network;

said lightwave core network includes a lightwave core router for executing a relay transfer process, and said lightwave edge router and said lightwave core router aggregate the user packets on the basis of QoS information prescribed in a lightwave router address as an address set to the lightwave network transfer and the user packet, and execute an intra-network routing process with respect to each of said lightwave edge router and said lightwave core router, wherein said lightwave edge router has a superframe deassembly transfer processing unit for identifying, with respect to the superframe having a lightwave router address addressed to said router itself from the lightwave network, a delimitation and a normality of each of the plurality of user packets stored in the data area by referring to the header of each of the user packets encapsulated in a data field, then deassembling and restoring the superframe into the user packets, determining an output destination port number for an execution of the subscriber interface process for transmission based on the header information of the restored user packets, and executing a transfer process to a relevant subscriber network.

7. A lightwave network data communications system in a lightwave network accommodating an existing subscriber network, comprising:

a lightwave access network for terminating layer 1 to 3 protocols with respect to a protocol of the existing network; and a lightwave core network, connected to said lightwave access network, for terminating the layer 1 protocol and the layer 2 protocol, wherein said lightwave access network converts a user packet of the terminated layer 3 into a lightwave adaptation layer of the layer 2 for transferring the packet matching with a synchronous digital hierarchy using a wavelength division multiplexing technology in the physical layer, wherein said lightwave access network includes a lightwave edge router for converting the user packets coming from the existing subscriber network and transferring the converted user packets to said lightwave core network;

said lightwave core network includes a lightwave core router for executing a relay transfer process, and said lightwave edge router and said lightwave core router aggregate the user packets on the basis of QoS information prescribed in a lightwave router address as an address set to the lightwave network transfer and the user packet, and execute an intra-network routing process with respect to each of said lightwave edge router and said lightwave core router, wherein said lightwave core router, when receiving a plurality of frames exhibiting a low packet encapsulation efficiency and having aggregated flow information, merges and reassembles pieces of information of the plurality of frames into a new superframe, and transfers this superframe.

8. A lightwave network data communications system according to claim 7, wherein said lightwave core router has a lightwave network interface card functioning as a connection point to the lightwave network, and said lightwave network line card includes a superframe assembly processing unit for transferring, if a data length of the superframe received from the lightwave network is over a fixed length, the superframe as it is to a posterior stage, if the data length of the superframe received is less than the fixed length, merging and assembling pieces of data of the plurality of superframes belonging to the same aggregated flow into a new superframe, and transferring this new superframe to the posterior stage.

9. A lightwave network data communications system according to claim 8, wherein said lightwave core router includes:

means for extracting the frames each having the same destination lightwave router address and AFL from the received frames, and accumulating those frames per AFL in said superframe assembly oriented memory;

means for encapsulating, if a quantity of the packet data accumulated exceeds over a prescribed length of the superframe, all pieces of packet data into the same superframe, and outputting the superframe with a header given thereto to the posterior stage; and means for monitoring a time-out with respect to the packet data per AFL in the process of being accumulated, and outputting the superframe with an occurrence of the time-out to the posterior stage even if a payload length thereof is under the prescribed length.

10. A lightwave network data communications system in a lightwave network accommodating an existing subscriber network, comprising:

a lightwave access network for terminating layer 1 to 3 protocols with respect to a protocol of the existing network; and a lightwave core network, connected to said lightwave access network, for terminating the layer 1 protocol and the layer 2 protocol, wherein said lightwave access network converts a user packet of the terminated layer 3 into a lightwave adaptation layer of the layer 2 for transferring the packet matching with a synchronous digital hierarchy using a wavelength division multiplexing technology in the physical layer, wherein said lightwave access network includes a lightwave edge router for converting the user packets coming from the existing subscriber network and transferring the converted user packets to said lightwave core network;

said lightwave core network includes a lightwave core router for executing a relay transfer process, and said lightwave edge router and said lightwave core router aggregate the user packets on the basis of QoS information prescribed in a lightwave router address as an address set to the lightwave network transfer and the user packet, and execute an intra-network routing process with respect to each of said lightwave edge router and said lightwave core router, wherein said lightwave edge router includes:

a lightwave adaptation frame assembly processing unit for obtaining a destination lightwave router address representing an address of a destination edge router in the lightwave network and an aggregated flow label for managing in aggregation transfer routes for the user packets having the destination addresses from the QoS information and the destination addresses of the user packets received from subscribers, encapsulating the user packets into a lightwave adaptation frame with the obtained lightwave router address and the aggregated flow label contained in header information, and transmitting the lightwave adaptation frame to said lightwave core network;

a superframe assembly processing unit for encapsulating, if a data length of the user packet received from the subscriber is over a fixed length, this one packet intact into a single frame as one lightwave adaptation frame and transferring the single frame to a posterior stage, and, if the data length of each of the user packets is less than the fixed length, encapsulating batchwise a plurality of user packets belonging to the same aggregated flow in a data area into a superframe having a large data length and transferring this superframe to the posterior stage; and a superframe deassembly transfer processing unit for identifying, with respect to the superframe having a lightwave router address addressed to said router itself from the lightwave network, a delimitation and a normality of each of the plurality of user packets stored in the data area by referring to the header of each of the user packets encapsulated in a data field, then deassembling and restoring the superframe into the user packets, determining an output destination port number for an execution of the subscriber interface process for transmission based on the header information of the restored user packets, and executing a transfer process to a relevant subscriber network.

11. A lightwave network data communications system in a lightwave network accommodating an existing subscriber network, comprising:

a lightwave access network for terminating layer 1 to 3 protocols with respect to a protocol of the existing network; and a lightwave core network, connected to said lightwave access network, for terminating the layer 1 protocol and the layer 2 protocol, wherein said lightwave access network converts a user packet of the terminated layer 3 into a lightwave adaptation layer of the layer 2 for transferring the packet matching with a synchronous digital hierarchy using a wavelength division multiplexing technology in the physical layer, wherein said lightwave access network includes a lightwave edge router for converting the user packets coming from the existing subscriber network and transferring the converted user packets to said lightwave core network;

said lightwave core network includes a lightwave core router for executing a relay transfer process, and said lightwave edge router and said lightwave core router aggregate the user packets on the basis of QoS information prescribed in a lightwave router address as an address set to the lightwave network transfer and the user packet, and execute an intra-network routing process with respect to each of said lightwave edge router and said lightwave core router, wherein said lightwave core router includes:
  a superframe assembly processing unit for transferring, if a data length of the superframe received from the lightwave network is over a fixed length, the superframe as it is to a posterior stage, if the data length of the superframe received is less than the fixed length, merging and assembling pieces of data of the plurality of superframes belonging to the same aggregated flow into a new superframe, and transferring this new superframe to the posterior stage, said superframe assembly processing unit having said superframe assembly oriented memory and a superframe management oriented memory for controlling an output and input of the frame, said superframe management oriented memory includes an AF management table for storing an information block number for storing data, a stored data quantity and a time-out value per AF number univocally identified from the AFL and the destination lightwave router address; an output block list for storing blocks for executing an output process of the assembled superframe in an output sequence; and a free block list for storing a list of the blocks stored with no data, and said superframe assembly processing unit reads from said AF management table an information block having an AF number for the received frame, adds the received frame to a data length, if the data length after being added is less than a prescribed length, updates the data length of said AF management table, whereas if the added data length exceeds the prescribed length, creates superframe header information for the relevant information block, adds the superframe header information to said output block list, then initializes an item of the AF number concerned, and adds the block with a completion of the output process to said free block list.

* * * * *